United States Patent [19]

Namba et al.

[11] Patent Number: 4,713,314

[45] Date of Patent: Dec. 15, 1987

[54] OPTICAL RECORDING MEDIUM

[75] Inventors: Kenryo Namba; Shigeru Asami; Toshiki Aoi; Kazuo Takahashi, all of Tokyo; Akihiko Kuroiwa, Yokohama, all of Japan

[73] Assignee: TDK Corporation, Tokyo, Japan

[21] Appl. No.: 827,928

[22] PCT Filed: May 2, 1985

[86] PCT No.: PCT/JP85/00253

§ 371 Date: Feb. 4, 1986

§ 102(e) Date: Feb. 4, 1986

[87] PCT Pub. No.: WO85/05078

PCT Pub. Date: Nov. 21, 1985

[30] Foreign Application Priority Data

May 7, 1984 [JP] Japan ............................ 59-90748
May 8, 1984 [JP] Japan ............................ 59-91567
Jun. 27, 1984 [JP] Japan ............................ 59-132702

[51] Int. Cl.$^4$ .......................... G03C 1/72; G11B 7/24
[52] U.S. Cl. ................................. 430/270; 430/945; 430/964; 430/346; 430/495; 430/338; 346/135.1
[58] Field of Search ............... 430/270, 945, 964, 346, 430/495, 338; 346/135.1

[56] References Cited

U.S. PATENT DOCUMENTS 4,465,767 8/1984 Oba et al. ...................... 430/271

FOREIGN PATENT DOCUMENTS 0147083 7/1985 European Pat. Off. ......... 430/495
177776 4/1984 Japan ............................... 430/495

Primary Examiner—Richard L. Schilling
Assistant Examiner—Lee C. Wright
Attorney, Agent, or Firm—Oblon, Fisher, Spivak, McClelland, & Maier

[57] ABSTRACT

The invention relates to an optical recording medium for effecting writing of information by means of recording light such as laser and reproduction or reading of the recorded information by means of reproduction or reading light, and provides an optical recording medium designed to prevent any degradation of the properties by the reading light and any lowering of writing sensitivity and reading S/N ratios. The optical recording medium including a recording layer 2 on a substrate 1 is characterized in that the recording layer 2 contains a mixture of a cyanine dye with a combination of cyanine dye cation with quencher anion.

44 Claims, 6 Drawing Figures

OPTICAL RECORDING MEDIUM

FIELD OF THE INVENTION

The present invention relates to an optical recording medium and, more particularly, to a heat mode optical recording medium.

DESCRIPTION OF THE PRIOR ART

Optical recording media are designed to come into no contact with writing or reading heads and, therefore, are characterized by enjoying perfect freedom from deterioration by wear. This has incited various studies directed to development of optical recording media.

In the optical recording media, those of the heat mode are commanding particular interest of researchers because they have no use for any darkroom treatment for development.

The heat mode optical recording medium is an optical recording medium which utilizes the recording light in the form of heat. For example, the pit-forming type optical recording medium is based on the procedure of writing given information on the medium by forming small holes called pits by removing or melting off a part of the medium with a recording light such as a laser and reading the recorded information by sensing these pits with reading light.

In the pit-forming type medium of this operating principle, particularly of the kind using a semiconductor laser permitting miniaturization of device, the recording layer is formed preponderantly of a material composed mainly of Te.

In recent years, increasing proposals and reports have come to cover those media which use recording layers of organic materials composed mainly of dyes in place of Te because Te type materials are harmful, and have to be sensitized to a higher degree and be produced at lower production costs.

Among the organic materials in the recording layers which require the He-Ne laser for the formation of pits, those using squalirium dyes [Japanese Patent Application Laid-open No. SHO 56(1981)-46,221 and V. B. Jipson and C. R. Jones.: J. Vac. Sci. Technol., 18, (1) 105 (1981)] and those using metal phthalocyanine dyes (Japanese Patent Application Laid-open No. SHO 57(1982)-82,094 and No. SHO 57(1982)-82,095) are included.

Another such organic material which similarly requires the He-Ne Laser uses a metal phthalocyanine dye (Japanese Patent Application Laid-open No. SHO 56(1981)-86,795).

These optical recording media invariably have their recording layers containing respective dyes deposited in the form of film by vacuum deposition and, in this sense, do not differ much from those using Te in terms of the production of recording medium.

Generally, since the laser beam impinging on the vacuum deposited film of dye has a low reflectance, the recording medium using this film fails to obtain an ample S/N ratio in the ordinary method of widespread acceptance which derives read signals from variations (decrease) in the amount of reflected light caused by pits.

When the optical recording medium is produced, which is of the so-called air-sandwich type construction having a recording layer opposed to and joined to a transparent substrate so that writing and reading of information is effected through the substrate, the recoridng layer can be protected from deterioration without lowering the writing sensitivity and the recording density can be improved. Even this recording and reproducing method is impracticable with the vacuum-deposited film of dye.

This is because, in the ordinary substrate made of transparent resin, the refractance has a certain value (1.5 in the case of polymethyl methacrylate) and the surface reflectance has a fairly large value (4% in the same resin) and the reflectance on the recording layer through the substrate is not more than about 60% in the case of polymethyl methacrylate, for example, and the recording layer which exhibits only a low reflectance, therefore, does not permit reliable detection of variations in the amount of reflected light.

For the purpose of improving the S/N ratio of reading of the recording layer formed of a vacuum deposited film of dye, a vacuum deposited reflecting film such as of Al is generally interposed between the substrate and the recording layer.

In this case, the purpose of the vacuum deposited reflecting film is to increase the reflectance and improve the S/N ratio. By the formation of pits, the reflecting film is exposed to open view to increase the reflectance. Or alternatively, the reflecting film is removed to decrease the reflectance, in some cases. As a matter of course, the recording and reproduction of information cannot be effected by light passed through the substrate.

The recording media in which a recording layer composed of a dye and resin is formed by the spreading technique have also been disclosed such as, for example, the medium using a recording layer formed of IR-132 dye (made by Kodak) and polyvinyl acetate (Japanese Patent Application Laid-open No. SHO 55(1980)-161,690), the medium using a recording layer formed of 1,1'-diethyl-2,2'-tricarbocyanine-iodide and nitrocellulose (Japanese Patent Application Laid-open No. SHO 57(1982)-74,845), and the medium using a recording layer formed of 3,3'-diethyl-12-acetylthiatetra-carbocyanine and polyvinyl acetate (K. Y. Law, et al., Appln. Phys. Lett. 39 (9) 718 (1981)).

These optical recording media also require interposition of a reflecting film between the substrate and the recording layer and, therefore, are as defective as those involving use of a vacuum deposited film of dye in respect that recording the reproduction are not obtained by light projected from behind the substrate.

To realize an optical recording medium possessing a recording layer of an organic material which permits recording and reproduction by light passed through the substrate and exhibits interchangeability with a medium including a recording layer of a Te-based material, the organic material itself is required to exhibit a higher reflectance.

In a very small fraction of the optical recording media so far developed, the recording layers of organic materials incorporated therein without interposition of any reflecting layer exhibit a high reflectance.

There have appeared publications purporting that a vacuum deposited film of vanadyl phthalocyanine exhibits a high reflectance [P. Kivits et al., Appl. Phys. Part A 26 (2) 101 (1981), Japanese Patent Application Laid-open No. SHO 55(1980)-97,033]. Despite the high reflectance which is possibly ascribable to the high subliming temperature of the compound, the film is found to possess a poor writing sensitivity.

It has been reported that cyanine dyes and merocyanine dyes of the thiazole type or quinoline type exhibit high writing sensitivity [Yamamoto et al.: Glossary of Manuscripts for the 27th Meeting of Applied Physics, lp-P-9 (1980)]. An invention based on this publication has been proposed under Japanese Patent Application Laid-open No. SHO 58(1983)-112,790. These dyes are impracticable, however, because the dyes, particularly when they are applied in the form of coating films, exhibit low degrees of solubility in solvents, undergo crystallization readily, show a very poor stability with respect to reading light, and quickly yield to decolorization.

In view of the state described above, the present inventors have already proposed a single-layer film of a cyanine dye of the indolenine type which is highly soluble in solvents, give rise to less crystallization, is thermally stable, and shows reflectance (Japanese Patent Application No. SHO 57(1982)-134,397 and No. SHO 57(1982)-134,170).

We have also proposed improvements in solubility and prevention of crystallization in the cyanine dyes of the indolenine type or the thiazole type, quinoline type, selenazole type, etc. by the incorporation of a long-chain alkyl group in the molecules thereof (Japanese Patent Application No. SHO 57(1982)-182,589 and No. SHO 57(1982)-177,776).

We have further proposed addition of quenchers to cyanine dye for the enhancement of photostability and particularly the prevention of decolorization by light (degradation by reading) (Japanese Patent Application No. SHO 57(1982)-166,832 and No. SHO 57(1982)-168,048).

Due to presence of unnecessary counter-cations and anions, however, the mixtures of cyanine dyes with quenchers of transition metal compounds offer a problem in connection with moistureproofness.

For that reason, it has been proposed to apply coating films comprising equimolar ionic combinations of cyanine dye cations with quencher anions of transition metal compounds for the purpose of introducing improvements in moistureproofness and storage properties (Japanese Patent Application No. SHO 59(1984)-18,878).

Referring incidentally to the equimolar ionic combinations of cyanine dye cations with quencher anions of transition metal compounds, the proportion of the cyanine dye is relatively reduced, leading to a drop of the dye content per unit weight of coating film. In most cases, the resulting optical recording medium shows a reduced absorptivity, resulting in the sensitivity of writing and S/N ratios of reading becoming insufficient.

Besides, the equimolar ionic combinations of cyanine dye cations with quencher anions of transition metal compounds give rise to a problem that any sufficiently high S/N ratio cannot be obtained owing to their poor solubility and film-forming properties.

In some cases, such a dye or dye composition is coated on a resinous substrate transparent to writing light and reading light in particular in the form of a recording layer for the particular purpose of effecting writing and reading from the back surface side of the substrate. However, there is a disadvantage that the reflectance of the recording layer is so low that any sufficiently high S/N ratio cannot again be obtained, since the resinous substrate is attacked on the surface by the solvent used from film coating.

For extended storage, it is also likely that the dye and other additives may dissolve and diffuse into the substrate resin, thus leading to a drop of reflectance.

Moreover, the substrate is damaged or otherwise dented due to heat generated by writing. This also leads to a drop of S/N ratios. After erasion, there is an increase in noises.

In order to overcome such drawbacks, for instance, it has been known to use as the underlying layer a hydrolysis coating film of a silane solution, a vacuum-deposited film of silicon oxide, etc. It has been found, however, that these films are insufficient in terms of their properties of affording solvent resistance and heat resistance to the substrate.

It has also been known to provide on the surface of the film a protective film formed of an inorganic compound; however, such a protective film is required to have a thickness of at least 0.2 microns. It is then well-known that there is a drop of sensitivity.

Turning to the optical recording film comprising a dye composition, pitting takes place simultaneously with light irradiation. Afterwards, the irradiated light is not absorbed at the central portion of that film, on which the largest energy is concentrated. This is responsible for a drop of the efficiency of the energy applied, and is attributable to the fact that sensitivity does not exceed a certain level.

DISCLOSURE OF THE INVENTION

An object of the present invention is to provide an optical recording medium including a recording layer comprising a cyanine dye composition, which undergoes reduced or limited degradation by reading or reproduction, shows more improved absorptivity and solubility, suffers no appreciable decrease in sensitivity and S/N ratios, and exhibits improved storage properties or shelf stability.

Another object of the present invention is to provide an optical recording medium comprising such a recording layer, wherein an improved undering layer is interposed between the substrate and the recording layer, thereby reducing the refractive index of said recording layer per se, preventing damage of the substrate, when said recording layer is provided thereon, and improving the S/N ratio of said recoridng layer.

Still another object of the present invention is to improve a surface layer to be provided on such a recording layer, thereby improving the writing sensitivity and reproduction or reading output level of the optical recording medium.

The foregoing objects are achieved by the invention to be described below.

More specifically, the present invention provides an optical recording medium including a recording layer on a substrate, characterized in that the recording layer contains a mixture of a cyanine dye with a bonded compound or combination of cyanine dye cation with quencher anion.

Preferred embodiments of the present invention are:

(1) The cyanine dye is an indolenine base cyanine dye.

(2) The cyanine dye cation is an indolenine base cyanine base cation.

(3) The quencher anion is an anion of a transition metal chelate compound.

(4) The anion of a transition metal chelate compound is an anion of a bis-phenyldithiol base transition metal complex.

(5) The combination is contained in an amount of 10 to 80 wt %.
(6) The recording layer has a thickness of 400 to 1200 Å.
(7) The substrate is substantially transparent to writing light and reading light.
(8) The substrate is formed of a resin.
(9) The resin is an acrylic or polycarbonate resin.
(10) Writing and reading are carried out from the back surface side of the substrate.
(11) No reflective layer is provided on the recording layer.
(12) The substrate includes thereon an underlying layer, which includes thereon the recording layer.
(13) The underlying layer is formed of a coating film of a colloidal particle dispersion of a silicon base condensate.
(14) The colloidal particle has a size of 30 to 100 Å.
(15) The underlying layer has a thickness of 50 to 500 Å.
(16) The substrate includes thereon the recording layer, which includes thereon a surface layer.
(17) The surface layer has a thickness of 50 to 300 Å.
(18) The surface layer is formed of a coating film of a colloidal particle dispersion of a silicon base condensate.

Figure 1:
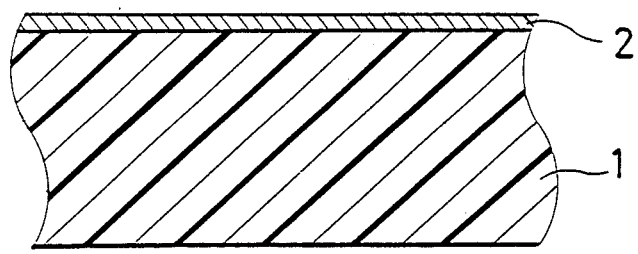
FIGS. 1 through 4 are partly sectioned views showing embodiments of the optical recording media according to the present invention.
Figure 2:
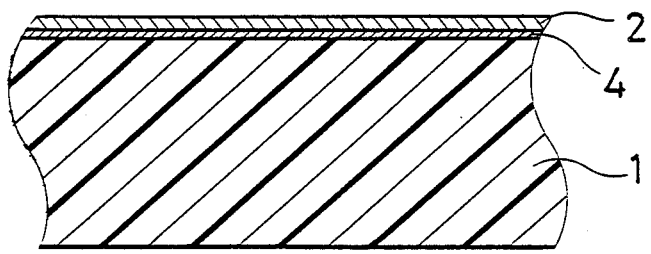

Reference numerals 1, 1' stand for substrates, 2, 2' recording layers, 3, 3' surface layers, and 4, 4' stand for underlying layers.

DETAILED DESCRIPTION OF THE INVENTION

The present invention will now be explained in detail with reference to the concrete construction thereof.

As illustrated in FIGS. 1 to 6, the optical recording medium includes a substrate 1 or 1' having thereon a recording layer 2 or 2'.

The recording layer 2 or 2' of the recording medium according to the present invention contains a cyanine dye.

In the present invention, a variety of cyanine dyes may be used with no particular restraint.

It should be noted, however, that preference is given to cyanine dyes expressed in terms of the following general formula I or II, since they introduce improvements in the sensitivity of writing and the S/N ratio of reading, when contained in the recording layer.

| General formula [I]  | $\Phi^+ - L = \Psi$ | $(X^-)$ m |
| General formula [II] | $\Phi = L - \Psi^+$ | $(X^-)$ m |

In the aforesaid general formulae (I) and (II), $\Phi$ denotes a monovalent or divalent residue of thiazole ring, oxazole ring, selenazole ring, imidazole or pyridine ring which may have an aromatic ring condensed thereto, and $\Psi$ denotes a divalent or monovalent residue of thiazole ring, oxazole ring, selenazole ring, imidazole ring, pyridine ring or indolenine ring which may have an aromatic ring condensed thereto, as in the case with $\Phi$, although both symbols may denote the same or different residue.

L stands for a polymethine connecting group for the formation of a cyanine dye, $X^-$ stands for an acid anion, and m may be 0 or 1.

In the isomerized structures expressed in terms of the general formulae (I) and (II), $\Phi$ denotes a monovalent or divalent residue of thiazole ring, oxazole ring, selenazole ring, imidazole ring or pyridine ring which may have condensed thereto an aromatic ring such as a benzene ring, naphthalene ring, phenanthrene ring or quinoxaline ring.

$\Psi$ denotes a divalent or monovalent residue of thiazole ring, oxazole ring, selenazole ring, imidazole ring, pyridine ring or indolenine ring which may have condensed thereto an aromatic ring such as a benzene ring, naphthalene ring, phenanthrene ring or quinoxaline ring.

Both symbols may denote the same or different ring.

It should be noted that $\Phi^+$ and $\Psi^+$ indicate that the nitrogen atom in the ring has plus charges, and $\Phi$ and $\Psi$ indicate that the nitrogen atom in the ring is neutral.

Preferably, the backbone rings of $\Phi$ and $\Psi$ should be expressed in terms of the following formulae ($\Phi$ I) to ($\Phi$ XVI) and ($\Psi$ I) to ($\Psi$ XVI) and more preferance is given to the indolenine base cyanine base dyes having the backbone structures represented by ($\Phi$ I) to ($\Phi$ IV) and ($\Psi$ I) to ($\Psi$ IV).

In the following, the structures of $\Phi$ and $\Psi$ will be expressed in the form of $\Phi^+$— and $\Psi=$.

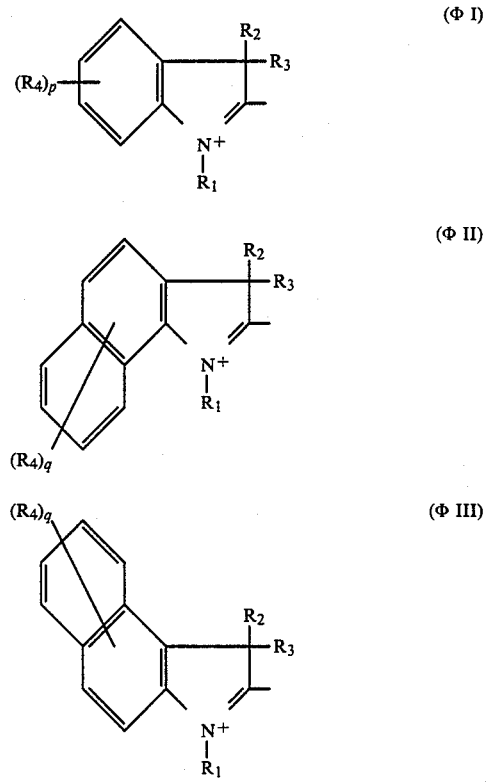

-continued
(Φ IV)
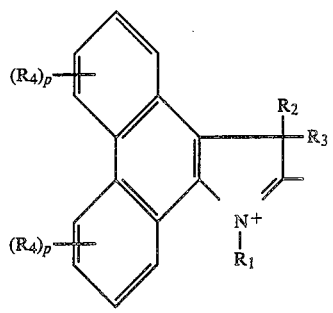
(Φ V)
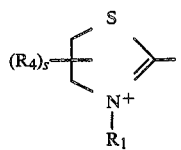
(Φ VI)
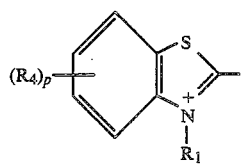
(Φ VII)
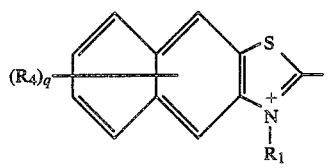
(Φ VIII)
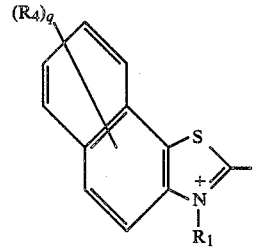
(Φ IX)
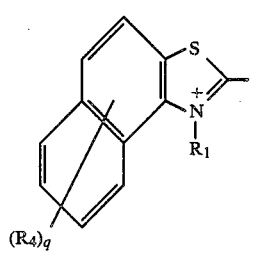
(Φ X)
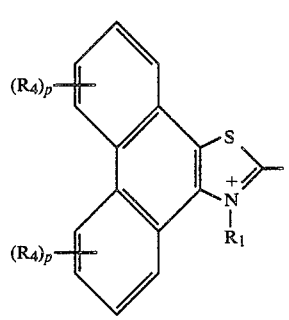
-continued
(Φ XI)
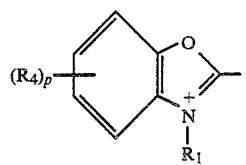
(Φ XII)
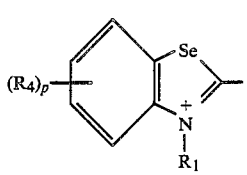
(Φ XIII)
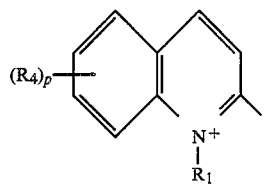
(Φ XIV)
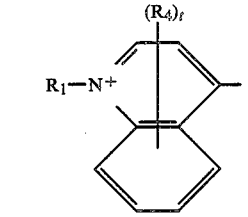
(Φ XV)
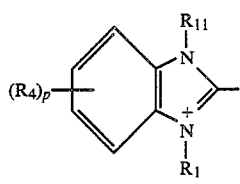
(Φ XVI)
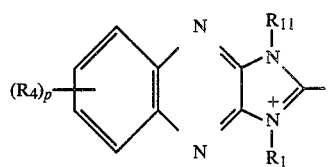
(Ψ I)
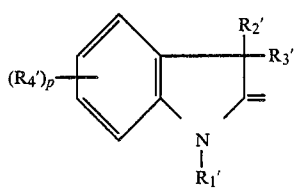
(Ψ II)
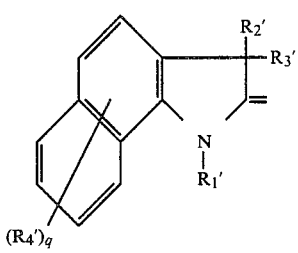

-continued
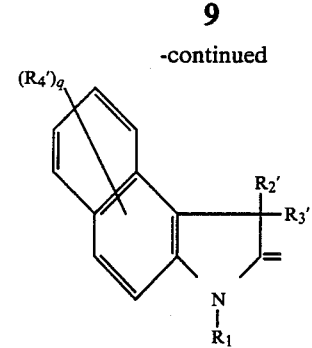 (Ψ III)
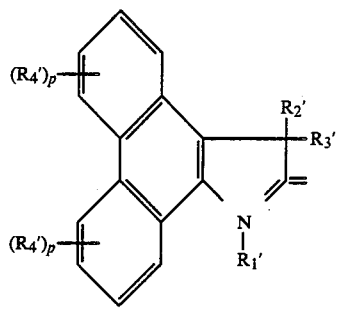 (Ψ IV)
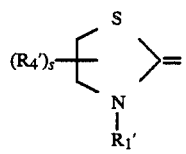 (Ψ V)
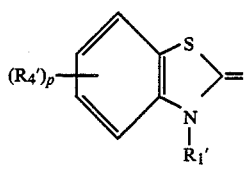 (Ψ VI)
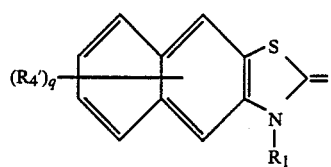 (Ψ VII)
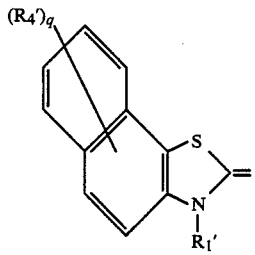 (Ψ VIII)
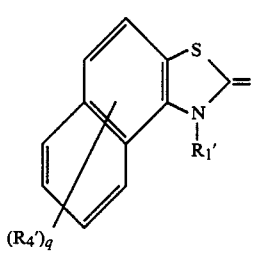 (Ψ IX)
-continued
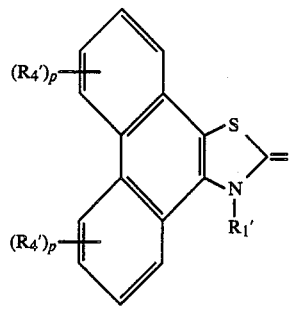 (Ψ X)
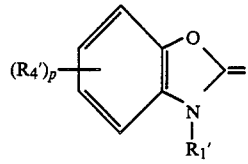 (Ψ XI)
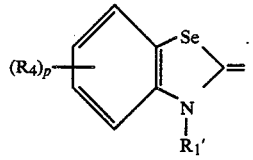 (Ψ XII)
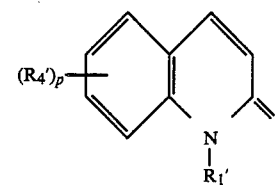 (Ψ XIII)
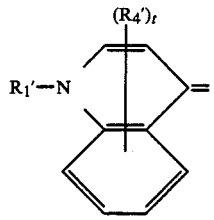 (Ψ XIV)
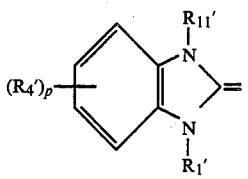 (Ψ XV)
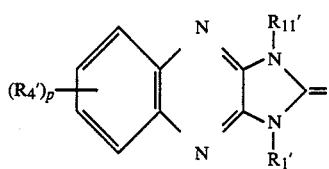 (Ψ XV)
In the various rings enumerated above, the groups $R_1$ and $R_1'$ ($R_{11}$ and $R_{11}'$) bonded to the nitrogen atom (two nitrogen atoms in the imidazole ring) in the ring each denote a substituted or unsubstituted alkyl group, aryl group or alkenyl group and an alkyl group in particular.

No particular limitation is placed on the number of carbon atoms in the groups $R_1$ and $R_1'$ bonded to the nitrogen atom in such groups.

Where these groups further include a substituent, the substituent may be any one member selected from the class consisting of sulfonic group, alkylcarbonyloxy group, alkylamide group, alkylsulfonamide group, alkoxycarbonyl group, alkylamino group, alkylcarbamoyl group, alkylsulfamoyl group, hydroxyl group, carboxy group, halogen atoms and the like.

Among others, particular preference is given to an unsubstituted alkyl or alkylcarbonyloxy group and an alkyl group substituted with a hydroxyl group, etc.

Where the ring of $\Phi(\Phi+)$ or $\Psi(\Psi+)$ is a condensed or uncondensed indolenine ring (Formulae [$\Phi$ I] to [$\Phi$ IV] and [$\Psi$ I] to [$\Psi$ IV]), it is desired to have two substituents $R_2$ and $R_3$, and $R_2'$ and $R_3'$ bonded to the 3 position thereof.

The two substituents $R_2$ and $R_3$, and $R_2'$ and $R_3'$ bonded to the 3 position of the ring are desired to be each an alkyl group or an aryl group. Among the substituents, preference is given to an unsubstituted alkyl group having 1 or 2, preferably 1 carbon atom.

The rings denoted by $\Phi$ and $\Psi$ may further have other subsitutents $R_4$, $R_4'$ bonded to specific positions in the rings. Examples of the substituents so bonded to the rings may include alkyl group, aryl group, heterocyclic residue, halogen atoms, alkoxy group, aryloxy group, alkylthio group, arylthio group, alkylcarbonyl group, arylcarbonyl group, alkyloxycarbonyl group, aryloxycarbonyl group, alkylcarbonyloxy group, arylcarbonyloxy group, alkylamide group, arylamide group, alkylcarbamoyl group, arylcarbamoyl, group, alkylamino group, arylamino group, carboxylic group, alkylsulfonyl group, arylsulfonyl group, alkylsulfonamide group, arylsulfonamide group, alkylsulfamoyl group, arylsulfamoyl group, cyano group and nitro group.

Generally, the numbers (p, q, r, s and t) of these substituents are 0 or about 1 to 4. Where p, q, r, s and t denote a number exceeding 2, a plurality of $R_4$s and $R_4$'s may be different from one another.

The symbol L denotes a polymethine connecting group for the formation of mono-, di-, tri- or tetracarbocyanine dyes. It is particularly desired to be any one group selected from the class represented by the formulae [L I] through [L IX].

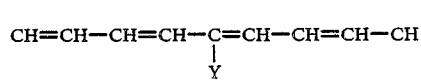

Formula (LI)

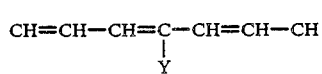

Formula (LII)

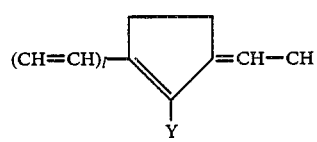

Formula (LIII)

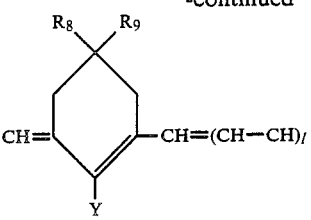

Formula (LIV)

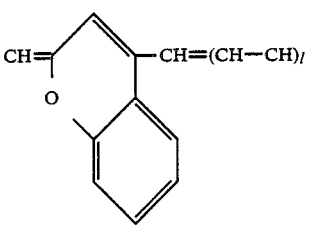

Formula (LV)

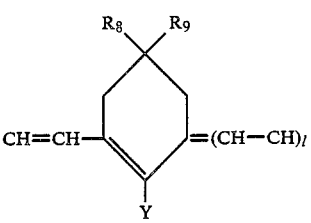

Formula (LVI)

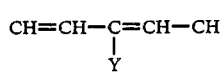

Formula (LVII)

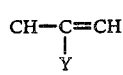

Formula (LVIII)

Formula [LIX]

In the formulae given above, Y denotes a hydrogen atom or a monovalent group. In this case, the monovalent group should preferably be one member selected from the class consisting of lower alkyl groups such as methyl group, lower alkoxy groups such as methoxy group, di-substituted amino groups such as dimethylamino group, diphenylamino group, methylphenylamino group, morpholino group, imidazolizine group and ethoxy-carbonyl-piperazine group, alkylcarbonyloxy groups such as acetoxy group, alkylthio groups such as methylthio group, cyano group, nitro group and halogen atoms such as Br and Cl.

$R_8$ and $R_9$ each denote a hydrogen atom or a lower alkyl group such as a methyl group, and l may be 0 or 1.

Furthermore, a symbol $X^-$ denotes anions, which preferably include $I^-$, $Br^-$, $ClO_4^-$, $BF_4^-$,

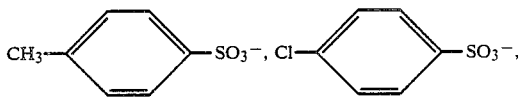

etc.

It is to be noted that m may be 0 or 1, but, when m is 0, $R_1$ of $\Phi$ has a minus charge, yielding an inner salt.

In what follows, reference will be made to the concrete examples of the cyanine dyes according to the present invention; it is understood, however, that the invention is not limited thereto, and Φ and Ψ shall indicate the aforesaid structural formulae.

| Dye No. | Φ, Ψ | $R_1, R_1$ | $R_2, R_3$ | $R_4$ | L | Y | l | X |
|---|---|---|---|---|---|---|---|---|
| D1 | [ΦI] | $CH_3$ | $CH_3$ | — | [LII] | H | | I |
| D2 | [ΦI] | $CH_3$ | $CH_3$ | — | [LII] | H | | $ClO_4$ |
| D3 | [ΦI] | $C_2H_4OH$ | $CH_3$ | — | [LII] | H | | Br |
| D4 | [ΦI] | $(CH_2)_3SO_3^-$ / $(CH_2)_3SO_3^-Na^+$ | $CH_3$ | — | [LII] | H | | — |
| D5 | [ΦII] | $CH_3$ | $CH_3$ | — | [LII] | H | | $ClO_4$ |
| D6 | [ΦIII] | $(CH_2)_3SO_3^-$ / $(CH_2)_3SO_3^-Na^+$ | $CH_3$ | — | [LII] | H | | — |
| D7 | [ΦIII] | $CH_2CH_2OH$ | $CH_3$ | — | [LII] | H | | $ClO_4$ |
| D8 | [ΦIII] | $(CH_2)_2OCOCH_3$ | $CH_3$ | — | [LII] | H | | BR |
| D9 | [ΦIII] | $(CH_2)_2OCOCH_3$ | $CH_3$ | — | [LIII] | $-N(C_6H_5)_2$ | 0 | $ClO_4$ |
| D10 | [ΦIII] | $CH_3$ | $CH_3$ | — | [LII] | H | | $ClO_4$ |
| D11 | [ΦIII] | $CH_3$ | $CH_3$ | — | [LIII] | $-N(C_6H_5)_2$ | 0 | $ClO_4$ |
| D12 | [ΦI] | $C_{18}H_{37}$ | $CH_3$ | — | [LII] | H | | I |
| D13 | [ΦI] | $C_4H_9$ | $CH_3$ | — | [LII] | H | | $ClO_4$ |
| D14 | [ΦI] | $C_8H_{16}OCOC_2H_5$ | $CH_3$ | — | [LIII] | $-N(C_6H_5)_2$ | 0 | $ClO_4$ |
| D15 | [ΦI] | $C_7H_{14}CH_2OH$ | $CH_3$ | — | [LII] | H | | I |
| D16 | [ΦII] | $C_8H_{17}$ | $CH_3$ | — | [LII] | H | | $ClO_4$ |
| D17 | [ΦIII] | $C_8H_{17}$ | $CH_3$ | — | [LII] | H | | — |
| D18 | [ΦIII] | $C_7H_{14}COO^-$ / $C_7H_{14}COOH$ | $CH_3$ | — | [LIII] | $-N\diagup\diagdown N-COOC_2H_5$ | 0 | — |
| D19 | [ΦIII] | $C_7H_{14}COOC_2H_5$ | $CH_3$ | — | [LII] | H | | $BF_4$ |
| D20 | [ΦIII] | $C_4H_9$ | $CH_3$ | — | [LIII] | $-N(C_6H_5)_2$ | 0 | $ClO_4$ |
| D21 | [ΦIII] | $C_{18}H_{37}$ | $CH_3$ | — | [LII] | H | | $ClO_4$ |
| D22 | [ΦIII] | $C_4H_9$ | $CH_3$ | — | [LII] | H | | $ClO_4$ |
| D23 | [ΦI] | $C_{17}H_{34}COOCH_3$ | $CH_3$ | — | [LII] | H | | I |
| D24 | [ΦI] | $C_8H_{16}OCOCH_3$ | $CH_3$ | — | [LIII] | $-N(C_6H_5)_2$ | 0 | I |
| D25 | [ΦI] | $C_8H_{17}$ | $C_2H_5$ | — | [LII] | H | | I |
| D26 | [ΦI] | $C_7H_{15}$ | $C_2H_5$ | — | [LII] | H | | I |
| D27 | [ΦII] | $C_{17}H_{34}COOCH_3$ | $CH_3$ | — | [LII] | H | | $ClO_4$ |
| D28 | [ΦII] | $C_8H_{16}CH_2OCOCH_3$ | $CH_3$ | — | [LIII] | $-N\diagup\diagdown N-COOC_2H_5$ | 0 | I |
| D29 | [ΦII] | $C_{17}H_{35}$ | $CH_3$ | — | [LIV] | $-N\diagup\diagdown N-COOC_2H_5$ | 0 | $ClO_4$ |
| D30 | [ΦII] | $C_7H_{14}COOCH_3$ | $C_2H_5$ | — | [LII] | H | | $ClO_4$ |
| D31 | [ΦIII] | $C_7H_{14}CH_2OH$ | $CH_3$ | — | [LII] | H | | $ClO_4$ |
| D32 | [ΦIII] | $C_7H_{14}CH_2OCOC_2H_5$ | $CH_3$ | — | [LII] | H | | I |
| D33 | [ΦIII] | $C_{17}H_{34}COOC_2H_5$ | $CH_3$ | — | [LIII] | $-N(C_6H_5)_2$ | 0 | I |
| D34 | [ΦIII] | $C_{17}H_{35}$ | $CH_3$ | — | [LIV] | H | 0 | I |
| D35 | [ΦIII] | $C_7H_{15}$ | $C_2H_5$ | — | [LII] | H | | I |
| D36 | [ΦIV] | $CH_3$ | $CH_3$ | — | [LII] | H | | I |
| D37 | [ΦIV] | $CH_3$ | $CH_3$ | — | [LII] | H | | $ClO_4$ |
| D38 | [ΦIV] | $C_4H_9$ | $CH_3$ | — | [LII] | H | | $ClO_4$ |
| D39 | [ΦIV] | $(CH_2)_2OCOCH_3$ | $CH_3$ | — | [LII] | H | | I |
| D40 | [ΦI] | $CH_2CH_2OCOCH_3$ | $CH_3$ | — | [LII] | H | | $ClO_4$ |
| D41 | [ΦI] | $CH_2CH_2OH$ | $CH_3$ | — | [LII] | H | | Br |
| D42 | [ΦIII] | $CH_3$ | $CH_3$ | — | [LVI] | Br | | $ClO_4$ |
| D43 | [ΦI] | $C_2H_5$ | $CH_3$ | $5-C_6H_5SO_2$ | [LVI] | Br | 1 | I |
| D44 | [ΦI] | $C_2H_5$ | $CH_3$ | $5-C_6H_5SO_2$ | [LIII] | Cl | 1 | $ClO_4$ |
| D45 | [ΦI] | $C_2H_5$ | $CH_3$ | $5-C_6H_5SO_2$ | [LIII] | Cl | 0 | I |
| D46 | [ΦI] | $C_2H_5$ | $CH_3$ | $5-C_6H_5SO_2$ | [LIII] | Cl | 0 | $CH_3C_6H_4SO_3$ |
| D47 | [ΦI] | $C_2H_5$ | $CH_3$ | $5-C_6H_5SO_2$ | [LVI] | Cl | 1 | $BF_4$ |
| D48 | [ΦI] | $C_2H_5$ | $CH_3$ | $5-C_6H_5SO_2$ | [LVI] | Cl | 1 | $ClO_4$ |
| D49 | [ΦI] | $C_2H_5$ | $CH_3$ | $5-C_6H_5SO_2$ | [LVI] | Cl | 0 | I |
| D50 | [ΦI] | $C_2H_5$ | $CH_3$ | $5-C_6H_5SO_2$ | [LVI] | Cl | 0 | $CH_3C_6H_4SO_3$ |
| D51 | [ΦI] | $CH_3$ | $CH_3$ | $5-C_6H_5SO_2$ | [LVI] | Cl | 0 | $ClO_4$ |
| D52 | [ΦI] | $CH_3$ | $CH_3$ | $5-C_6H_5SO_2$ | [LVI] | Cl | 0 | I |
| D53 | [ΦI] | $n-C_4H_9$ | $CH_3$ | $5-C_6H_5SO_2$ | [LVI] | Cl | 1 | $ClO_4$ |
| D54 | [ΦI] | $n-C_6H_{13}$ | $CH_3$ | $5-C_6H_5SO_2$ | [LVI] | Cl | 1 | $ClO_4$ |

-continued

| Dye No. | Φ, Ψ | $R_1$, $R_1$ | $R_2$, $R_3$ | $R_4$ | L | Y | l | X |
|---|---|---|---|---|---|---|---|---|
| D55 | [ΦI] | (CH$_2$)$_4$SO$_3^-$ / (CH$_2$)$_4$SO$_3$H | CH$_3$ | 5-C$_6$H$_5$SO$_2$ | [LVI] | Cl | 1 | — |
| D56 | [ΦI] | C$_2$H$_5$ | CH$_3$ | 5-C$_6$H$_5$SO$_2$ | [LVI] | N═C═C—CN | 1 | — |
| D57 | [ΦI] | CH$_3$ | CH$_3$ | 5-C$_6$H$_5$SO$_2$ | [LVI] | N═C═C—CN | 1 | — |
| D58 | [ΦI] | C$_2$H$_5$ | CH$_3$ | 5-C$_6$H$_5$CO | [LIII] | Cl | 1 | I |
| D59 | [ΦI] | C$_2$H$_5$ | CH$_3$ | 5-C$_6$H$_5$CO | [LIII] | Br | 1 | I |
| D60 | [ΦI] | C$_2$H$_5$ | H$_3$ | 5-C$_6$H$_5$CO | [LIII] | Cl | 1 | ClO$_4$ |
| D61 | [ΦI] | C$_2$H$_5$ | CH$_3$ | 5-C$_6$H$_5$CO | [LIII] | Cl | 1 | CH$_3$C$_6$H$_4$SO$_3$ |
| D62 | [ΦI] | C$_2$H$_5$ | CH$_3$ | 5-C$_6$H$_5$CO | [LVI] | Cl | 1 | ClO$_4$ |
| D63 | [ΦI] | C$_2$H$_5$ | CH$_3$ | 5-C$_6$H$_5$CO | [LVI] | Cl | 1 | I |
| D64 | [ΦI] | C$_2$H$_5$ | CH$_3$ | 5-C$_6$H$_5$CO | [LVI] | Cl | 0 | CH$_3$C$_6$H$_4$SO$_3$ |
| D65 | [ΦI] | CH$_3$ | CH$_3$ | CH$_3$CO | [LII] | H | | ClO$_4$ |
| D66 | [ΦI] | CH$_3$ | CH$_3$ | CH$_3$CO | [LII] | H | | I |
| D67 | [ΦI] | C$_2$H$_4$OCOCH$_3$ | CH$_3$ | CH$_3$CO | [LII] | H | | I |
| D68 | [ΦV] | C$_2$H$_5$ | — | 4-CH$_3$ | [LII] | H | | I |
| D69 | [ΦV] | CH$_3$ | — | 4-CH$_3$ | [LII] | H | | I |
| D70 | [ΦVI] | C$_2$H$_5$ | — | — | [LII] | H | | Br |
| D71 | [ΦVI] | C$_2$H$_5$ | — | 5-Cl | [LIII] | —N(C$_6$H$_5$)$_2$ | 0 | Br |
| D72 | [ΦVI] | C$_2$H$_5$ | — | 5-OCH$_3$ | [LII] | H | | CH$_3$C$_6$H$_4$SO$_3$ |
| D73 | [ΦVI] | C$_2$H$_5$ | — | 5-OCH$_3$ | [LII] | H | | Br |
| D74 | [ΦVI] | C$_2$H$_5$ | — | — | [LIV] | H ($R_8$, $R_9$ = CH$_3$) | 1 | Br |
| D75 | [ΦVI] | C$_2$H$_5$ | — | — | [LII] | H | | Br |
| D76 | [ΦVI] | C$_2$H$_5$ | — | — | [LI] | H | | Br |
| D77 | [ΦVI] | C$_2$H$_5$ | — | — | [LII] | CH$_3$ | | Br |
| D78 | [ΦVI] | C$_2$H$_5$ | — | — | [LV] | H | 1 | Br |
| D79 | [ΦVI] | C$_2$H$_5$ | — | — | [LV] | H | 0 | Br |
| D80 | [ΦVI] | C$_2$H$_5$ | — | — | [LVI] | H ($R_8$, $R_9$ = CH$_3$) | 0 | Br |
| D81 | [ΦVII] | (CH$_2$)$_3$OCOCH$_3$ | — | — | [LIII] | N(C$_6$H$_5$)$_2$ | 0 | CH$_3$C$_6$H$_4$SO$_3$ |
| D82 | [ΦVI] | CH$_2$CH$_2$OH | — | 5-Cl | [LII] | H | | CH$_3$C$_6$H$_4$SO$_3$ |
| D83 | [ΦVIII] | C$_2$H$_5$ | — | — | [LII] | H | | Br |
| D84 | [ΦIX] | C$_2$H$_5$ | — | — | [LII] | H | | Br |
| D85 | [ΦIX] | C$_2$H$_5$ | — | — | [LIII] | —N⟨ ⟩COOC$_2$H$_5$ | 0 | ClO$_4$ |
| D86 | [ΦIX] | C$_2$H$_5$ | — | — | [LIII] | OCH$_3$ | 1 | I |
| D87 | [ΦX] | C$_2$H$_5$ | — | — | [LII] | H | | I |
| D88 | [ΦXI] | CH$_2$CH$_2$OH | — | — | [LII] | H | | Br |
| D89 | [ΦXII] | C$_2$H$_5$ | — | — | [LII] | H | | I |
| D90 | [ΦXII] | (CH$_2$)$_3$OCOCH$_3$ | — | — | [LII] | —N⟨ ⟩COOC$_2$H$_5$ | | ClO$_4$ |
| D91 | [ΦXIII] | C$_2$H$_5$ | — | — | [LII] | H | | I |
| D92 | [ΦXIII] | CH$_2$CH$_2$CH$_2$SO$_3$H | — | — | [LIII] | —N(C$_6$H$_5$)$_2$ | 0 | ClO$_4$ |
| D93 | [ΦXII] | C$_2$H$_5$ | — | — | [LIII] | —N(C$_6$H$_5$)$_2$ | 0 | I |
| D94 | [ΦXIV] | C$_2$H$_5$ | — | — | [LII] | H | | Br |
| D95 | [ΦXV] | C$_2$H$_5$ | — | — | [LII] | H | | Br |
| D96 | [ΦVI] | C$_8$H$_{17}$ | — | 4-CH$_3$ | [LII] | H | | I |
| D97 | [ΦVI] | C$_{18}$H$_{37}$ | — | — | [LIII] | —N(C$_6$H$_5$)$_2$ | 0 | Br |
| D98 | [ΦVI] | C$_8$H$_{17}$ | — | — | [LII] | H | | ClO$_4$ |
| D99 | [ΦVI] | C$_8$H$_{17}$ | — | 5-Cl | [LIII] | —N(C$_6$H$_5$)$_2$ | 0 | ClO$_4$ |
| D100 | [ΦVI] | C$_{18}$H$_{37}$ | — | 5-Cl | [LII] | H | | I |
| D101 | [ΦVI] | C$_8$H$_{17}$ | — | 5-OCH$_3$ / 6-OCH$_3$ | [LII] | H | | I |
| D102 | [ΦVI] | C$_8$H$_{17}$ | — | 5-OCH$_3$ | [LIV] | — | 0 | I |
| D103 | [ΦVI] | C$_8$H$_{17}$ | — | 5-Cl | [LIII] | —N(C$_6$H$_5$)$_2$ | 0 | Br |
| D104 | [ΦVI] | C$_{18}$H$_{37}$ | — | 5-Cl | [LIII] | —N(C$_6$H$_5$)$_2$ | 0 | Br |
| D105 | [ΦVI] | C$_8$H$_{17}$ | — | — | [LII] | —N⟨ ⟩COOC$_2$H$_5$ | | I |
| D106 | [ΦVI] | C$_8$H$_{17}$ | — | — | [LII] | H | | I |
| D107 | [ΦVI] | C$_{18}$H$_{37}$ | — | 5-Cl | [LII] | H | | CH$_3$C$_6$H$_4$SO$_3$ |
| D108 | [ΦVI] | C$_{18}$H$_{37}$ | — | 5-Cl | [LII] | H | | ClC$_6$H$_4$SO$_3$ |
| D109 | [ΦVI] | C$_8$H$_{17}$ | — | — | [LV] | H | 0 | I |

-continued

| Dye No. | Φ, Ψ | $R_1$, $R_1$ | $R_2$, $R_3$ | $R_4$ | L | Y | l | X |
|---|---|---|---|---|---|---|---|---|
| D110 | [ΦVI] | $C_8H_{17}$ | — | — | [LVI] | H ($R_8$, $R_9$ = $CH_3$) | 0 | Br |
| D111 | [ΦVI] | $C_8H_{17}$ | — | — | [LVII] | — | | I |
| D112 | [ΦVII] | $C_8H_{17}$ | — | — | [LVII] | H | | Br |
| D113 | [ΦVII] | $C_{18}H_{37}$ | — | — | [LII] | H | | $CH_3C_6H_4SO_3$ |
| D114 | [ΦVII] | $C_{13}H_{27}$ | — | — | [LII] | H | | Br |
| D115 | [ΦVII] | $C_{13}H_{27}$ | — | — | [LII] | H | | Br |
| D116 | [ΦVII] | $C_8H_{17}$ | — | — | [LIII] | —N⟨ ⟩COOC$_2$H$_5$ | 0 | $ClO_4$ |
| D117 | [ΦVII] | $C_8H_{17}$ | — | — | [LVII] | $OCH_3$ | | I |
| D118 | [ΦVII] | $C_{18}H_{37}$ | — | — | [LVII] | H | | $CH_3C_6H_4SO_3$ |
| D119 | [ΦVII] | $C_8H_{17}$ | — | — | [LII] | H | | $CH_3C_6H_4SO_3$ |
| D120 | [ΦVII] | $C_{18}H_{37}$ | — | — | [LIII] | —N($C_6H_5$)$_2$ | 0 | $CH_3C_6H_4SO_3$ |
| D121 | [ΦXI] | $C_8H_{17}$ | — | — | [LII] | H | | Br |
| D122 | [ΦXII] | $C_8H_{17}$ | — | — | [LII] | H | | I |
| D123 | [ΦXII] | $C_8H_{17}$ | — | — | [LIII] | —N⟨ ⟩COOC$_2$H$_5$ | 0 | $ClO_4$ |
| D124 | [ΦXII] | $C_{13}H_{27}$ | — | 5-Cl | [LII] | H | | I |
| D125 | [ΦXII] | $C_8H_{17}$ | — | — | [LIII] | —N($C_6H_5$)$_2$ | 0 | Br |
| D126 | [ΦXII] | $C_{18}H_{37}$ | — | — | [LIII] | —N($C_6H_5$)$_2$ | 0 | Br |
| D127 | [ΦXIV] | $C_8H_{17}$ | — | — | [LVII] | H | | Br |
| D128 | [ΦXV] | $C_8H_{17}$ | — | — | [LVII] | H | | Br |
| D129 | [ΦV] | $C_8H_{17}$ | — | — | [LVII] | H | | Br |
| D130 | [ΦVIII] | $C_8H_{17}$ | — | — | [LVII] | H | | Br |
| D131 | [ΦXIII] | $C_8H_{17}$ | — | — | [LVII] | H | | Br |
| D132 | [ΦI] [ΦXVI] | $CH_2=CHCH_2$ $CH_2=CHCH_2$ $CH_2=CHCH_2$ | $CH_3$ | 5-$C_6H_5CO$—ΨI | [LVIII] | H | | $CH_3C_6H_4SO_3$ |
| D133 | [ΦXVI] | $CH_2=CHCH_2$ | — | — | [LVIII] | H | | $CH_3C_6H_4SO_3$ |
| D134 | [ΦXVI] | $CH_2=CHCH_2$ | — | 5-Cl | [LVIII] | H | | $CH_3C_6H_4SO_3$ |
| D135 | [ΦXVI] | $CH_2=CHCH_2$ | — | 5-$C_6H_5SO_2$ | [LVIII] | H | | $CH_3C_6H_4SO_3$ |
| D136 | [ΦXVI] | $CH_2=CHCH_2$ | — | 5-$C_6H_5CO$ | [LVIII] | H | | $ClO_4$ |
| D137 | [ΦXVI] | $CH_2=CHCH_2$ | — | 5-$NO_2$ 6-Cl | [LVIII] | H | | $CH_3C_6H_4SO_3$ |
| D138 | [ΦXVI] | $CH_2OCH_3$ $(CH_2)_3N(CH_3)_2$ | — | 5-$C_6H_5SO_2$ 6-$NO_2$ | [LVIII] | H | | $ClO_4$ |
| D139 | [ΦXVI] | $C_6H_5$ | — | 5-$C_6H_5SO_2$ | [LVIII] | H | | $CH_3C_6H_4SO_3$ |
| D140 | [ΦXVI] | $C_2H_4OCH_3$ | — | 5-$NO_2$ | [LVIII] | H | | $CH_3C_6H_4SO_3$ |
| D141 | [ΦXVI] | $CH_2=CHCH_2$ | — | 5-$NO_2$ | [LVIII] | H | | $ClO_4$ |
| D142 | [ΦXVI] | $C_2H_4OCH_3$ | — | 5-$C_6H_5SO_2$ | [LVII] | H | | $CH_3C_6H_4SO_3$ |
| D143 | [ΦXVI] | $C_2H_4OCH_3$ | — | 5-$C_6H_5SO_2$ | [LVII] | H | | $ClO_4$ |
| D144 | [ΦXVI] | $CH_2CHCH_2$ | — | $NO_2$ | [LVII] | H | | $ClO_4$ |
| D145 | [ΦVI] [ΦXVI] | ΨVI—$C_2H_5$ ΨXVI—$C_2H_4COCH_3$ | — | 5-$NO_2$—ΨVI 5-$C_6H_5CO$—ΨXVI | [LVIII] | H | | I |
| D146 | [ΦVI] [ΦXVI] | ΨVI—$C_2H_5$ ΨXVI—$(CH_2)_4SO_3^-$ | — | 5-$NO_2$—ΨVI 5-$C_6H_5SO_2$—ΨXVI | [LVIII] | H | | — |

Such cyanine dyes can easily be synthesized by following the methods described in publications such as, for instance, Great Organic Chemistry, Nitrogen-containing Heterocyclic Compounds I, page 432 (Asakura Shoten).

More exactly, a correspoinding Φ'-$CH_3$ (wherein Φ' denotes a ring corresponding to the aforementioned Φ) is first heated in combination with an excess amount of $R_1I$ (wherein $R_1$ denotes an alkyl group or aryl group) to introduce $R_1$ into the nitrogen atom in Φ' to produce Φ—$CH_3I^-$. Alternatively, a backbone ring derivative such as indolenine may be obtained from acetylene alcohol according to the ordinary procedures of Fisher or the method of Harald et al (Synthesis, 958, 1981).

Then, the resulting product may be subjected to dehydrogenation condensation with an unsaturated dialdehyde or unsaturated hydroxyaldehyde in the presence of an alkali catalyst.

Alternatively, pyridine may be cleavaged into glutacone aldehyde according to the ZINCK reaction, which is in turn allowed to react with a quaternary salt of a backbone ring derivative such as indolenine to obtain tricarbocyanine.

These cyanine dyes are usually contained in the recording layer in the form of a monomer, but may be present in the form of a polymer, if required.

In this case, the polymer is formed of at least two molecules of the cyanine dye. It may be a condensate of such cyanine dyes.

To this end use may also be made of, e.g., a homo- or co-polycondensate of the aforementioned cyanine dye including one or more of at least one kind of functional groups such as —OH, —COOH or —SO$_3$H, or a copolycondensate thereof with other copolycondensation components such as dialcohol, dicarboxylic acid or a chloride thereof, diamine, di- or tri-isocyanate, di-epoxy compound, acid anhydride, di-hydrazine or diiminocarbonate, or with other dyes.

Alternatively, the polymer may be obtained by crosslinking the cyanine dye having the aforesaid functional group either alone or in conjunction with other dyes or spacer components with the use of a metal crosslinking agent.

For instance, the metal crosslinking agents used to this end may include alkoxides of titanium, zirconium and aluminium, chelates of titanium, zirconium and aluminium (such as, e.g., those including betadiketone, ketoesters, hydroxycarboxylic acids and esters thereof, ketoalcohols, aminoalcohols, and enolically active hydrogen compounds as ligands), and sialates of titanium, zirconium, aluminium, etc.

Use may further be made of at least one kind of cyanine dyes including at least one group selected from the class consisting of —OH group, —OCOR group and —COOR group (wherein R denotes a substituted or unsubstituted alkyl group or aryl group) or a product obtained by transesterification thereof with other spacer components or dyes for bonding with —COO— group.

It is preferred in this case that the transesterification reaction is effected using as the catalyst an alkoxide of titanium, zirconium, aluminium, etc.

Moreover, the aforesaid cyanine dye may be bonded to resin for use.

In this case, the resin used is required to include a predetermined group. As is the case with the aforesaid polymer, that resin should be coupled to the side chain of the cyanine dye, optionally through the medium of a spacer component, etc., by means of condensation, transesterification or crosslinking. In the present invention, two or more of such cyanine dyes may be used.

Japanese Patent Application No. SHO 59(1984)-62,025 discloses preferred combinations of two or more of cyanine dyes to be used.

As long as the effect of the present invention is achieved, the cyanine dye or dyes may be used in conjunction with other dye or dyes to form the recording layer.

In addition to the cyanine dye or dyes as mentioned above, the recording layer forming a part of the optical recording medium according to the present invention also contains a bonded compound or combination of cyanine dye cation with quencher anion.

No especial limitation is placed upon the ionic valency of the cyanine dye cation and quencher anion. They may be used in various combinations, but their valencies are usually 1.

In other words, the ionic combination according to the present invention is expressed in terms of $D^+ \cdot Q^-$ wherein $D^+$ is cyanine dye cation, and $Q^-$ is the quencher anion.

In the present invention, various cations of the cyanine dye forming a part of the ionic combination may be used without any special restraint.

It should be noted that, when contained in the recording layer, the cations of the cyanine dyes expressed in terms of the following general formulae (III) and (IV) give rise to a high writing sensitivity and a high reading S/N ratio.

Among others, the most preference is given to the indolenine base cyanine dye cations.

| General formula [III] | $\Phi^+ - L = \Psi \cdot Q^-$ |
|---|---|
| General formula [IV] | $\Phi = L - \Psi^+ \cdot Q^-$ | wherein $\Phi$, $\Psi$ and L have the same meanings as mentioned in the foregoing, and $Q^-$ stands for the quencher anion.

In the following, reference will be made to the concrete examples of the cyanine dye cations used in the present invention.

| | Φ | R₁ | R₂, R₃ | R₄ | Ψ | R₁' | R₂', R₃' | R₄' | L | Y | |
|---|---|---|---|---|---|---|---|---|---|---|---|
| D+1 | ΦI | CH₃ | CH₃ | 5-CH₃SO₂ | ΨI | CH₃ | CH₃ | 5-CH₃SO₂ | LIII | H | — |
| D+2 | ΦI | C₂H₅ | CH₃ | — | ΨI | C₂H₅ | CH₃ | — | LII | N(C₆H₅)₂ | — |
| D+3 | ΦIII | CH₃ | CH₃ | — | ΨIII | CH₃ | CH₃ | — | LII | H | — |
| D+4 | ΦIII | C₈H₁₇ | CH₃ | — | ΨIII | C₈H₁₇ | CH₃ | — | LII | H | — |
| D+5 | ΦIII | C₁₈H₃₇ | CH₃ | — | ΨIII | C₁₈H₃₇ | CH₃ | — | LIII | H | — |
| D+6 | ΦIII | CH₃ | CH₃ | — | ΨIII | CH₃ | CH₃ | — | LII | N(C₆H₅)₂ | — |
| D+7 | ΦIII | CH₂CH₂OCOCH₃ | CH₃ | — | ΨIII | CH₂CH₂OCOCH₃ | CH₃ | — | LII | N(C₆H₅)₂ | — |
| D+8 | ΦIII | CH₂CH₂OCOCH₃ | CH₃ | — | ΨIII | CH₂CH₂OCOCH₃ | CH₃ | — | LII | Br | — |
| D+9 | ΦII | CH₃ | CH₃ | — | ΨI | CH₃ | CH₃ | — | LII | H | — |
| D+10 | ΦII | CH₃ | CH₃ | — | ΨII | CH₃ | CH₃ | — | LVI | H | — |
| D+11 | ΦII | C₄H₉ | CH₃ | — | ΨI | C₄H₉ | CH₃ | — | LII | H | — |
| D+12 | ΦI | CH₂CH₂OH | CH₃ | — | ΨI | CH₂CH₂OH | CH₃ | — | LII | H | — |
| D+13 | ΦIII | CH₂CH₂OH | CH₃ | — | ΨIII | CH₂CH₂OH | CH₃ | — | LII | N(C₆H₅)₂ | — |
| D+14 | ΦIII | C₄H₉ | CH₃ | — | ΨIII | C₄H₉ | CH₃ | — | LVII | H | — |
| D+15 | ΦI | CH₂CH₂OCOCH₃ | CH₃ | — | ΨI | CH₂CH₂OCOCH₃ | CH₃ | — | LVI | H | — |
| D+16 | ΦIII | CH₃ | CH₃ | — | ΨIII | CH₃ | CH₃ | — | LVI | H | — |
| D+17 | ΦI | CH₃ | CH₃ | — | ΨI | CH₃ | CH₃ | — | LIII | N(C₆H₅)₂ | — |
| D+18 | ΦIII | CH₃ | CH₃ | — | ΨIII | CH₃ | CH₃ | — | LII | H | — |
| D+19 | ΦI | CH₃ | CH₃ | — | ΨI | CH₃ | CH₃ | — | LVII | H | — |
| D+20 | ΦI | CH₃ | CH₃ | — | ΨI | CH₃ | CH₃ | — | LII | Br | — |
| D+21 | ΦI | CH₃ | CH₃ | — | ΨI | CH₃ | CH₃ | — | LII | Cl | — |
| D+22 | ΦIII | CH₃ | CH₃ | — | ΨIII | CH₃ | CH₃ | — | LVI | Cl | — |
| D+23 | ΦIII | CH₃ | CH₃ | — | ΨIII | CH₃ | CH₃ | — | LVI | Cl | — |
| D+24 | ΦI | CH₃ | CH₃ | — | ΨIII | CH₃ | CH₃ | — | LII | H | — |
| D+25 | ΦVI | C₂H₅ | — | — | ΨVI | C₂H₅ | — | — | LIII | N(C₆H₅)₂ | — |
| D+26 | ΦVI | C₂H₅ | — | 6-Cl | ΨVI | C₂H₅ | — | 6-Cl | LII | H | — |
| D+27 | ΦVI | C₈H₁₇ | — | — | ΨVI | C₈H₁₇ | — | — | LIII | H | — |
| D+28 | ΦVI | C₈H₁₇ | — | 6-Cl | ΨVI | C₈H₁₇ | — | 6-Cl | LII | H | — |
| D+29 | ΦVI | C₈H₁₇ | — | 6-Cl | ΨVI | C₈H₁₇ | — | 6-Cl | LII | H | — |
| D+30 | ΦVII | C₈H₁₇ | — | — | ΨVII | C₈H₁₇ | — | — | LVI | H | — |
| D+31 | ΦVII | C₂H₅ | — | — | ΨVII | C₂H₅ | — | — | LII | N(C₆H₅)₂ | — |
| D+32 | ΦXIV | C₂H₅ | — | — | ΨXIV | C₂H₅ | — | — | LIII | H | — |
| D+33 | ΦXIV | C₂H₅ | — | — | ΨXIV | C₂H₅ | — | — | LVIII | H | — |
| D+34 | ΦXIV | C₂H₅ | — | — | ΨXIV | C₂H₅ | — | — | LVII | Cl | — |
| D+35 | ΦXIII | C₂H₅ | — | — | ΨXIII | C₂H₅ | — | — | LIV | Br | (R⁸, R⁹ = H) |
| D+36 | ΦXIII | C₂H₅ | — | — | ΨXIII | C₂H₅ | — | 6-C₂H₅O | LII | H | — |
| D+37 | ΦXIII | C₂H₅ | — | — | ΨXIII | C₂H₅ | — | 6-N(CH₃)₂ | LIX | H | — |
| D+38 | ΦXIII | CH₂COOC₂H₅ | — | — | ΨXIII | CH₂COOC₂H₅ | — | 6-C₂H₅O | LII | N(C₆H₅)₂ | — |
| D+39 | ΦXVI | C₂H₅ | — | — | ΨXVI | C₂H₅ | — | — | LIII | H | — |
| D+40 | ΦXIII | C₇H₁₅ | — | — | ΨXIII | C₇H₁₅ | — | — | LVII | H | — |
| D+41 | ΦXIII | CH₃ | — | 6-C₂H₅O | ΨXIII | CH₃ | — | 6-C₂H₅O | LIII | N(C₆H₅)₂ | — |
| D+42 | ΦXIII | C₂H₅ | — | 6-N(CH₃)₂ | ΨXIII | C₂H₅ | — | — | LVII | Cl | — |
| D+43 | ΦXIII | C₂H₅ | — | 6-C₂H₅O | ΨXIII | C₂H₅ | — | — | LIII | Cl | — |
| D+44 | ΦXIII | C₁₈H₃₇ | — | — | ΨXIII | C₁₈H₃₇ | — | — | LII | Cl | — |
| D+45 | ΦXIII | C₂H₅ | — | — | ΨXIII | C₂H₅ | — | 6-C₂H₅O | LIII | N(C₆H₅)₂ | — |
| D+46 | ΦXIV | CH₃ | — | 6-C₂H₅O | ΨXIV | CH₃ | — | — | LII | H | — |
| D+47 | ΦVI | C₂H₅ | — | 5-CH₃ | ΨVI | C₂H₅ | — | 5-CH₃ | LII | H | — |
| D+48 | ΦVI | C₃H₇ | — | 5-CH₃ | ΨVI | C₃H₇ | — | 5-CH₃ | LII | H | — |
| D+49 | ΦVI | C₂H₅ | — | 5-CH₃O | ΨVI | C₂H₅ | — | 5-CH₃O | LVII | H | — |
| D+50 | ΦVI | C₂H₅ | — | 6-CH₃O | ΨVI | C₂H₅ | — | 6-CH₃O | LVII | Cl | — |

-continued

| | Φ | R₁ | R₂, R₃ | R₄ | Ψ | R₁' | R₂', R₃' | R₄' | L | Y | |
|---|---|---|---|---|---|---|---|---|---|---|---|
| D + 51 | Φ IX | C₂H₅ | — | — | Ψ IX | C₂H₅ | — | — | L II | H | — |
| D + 52 | Φ VI | C₁₈H₃₇ | — | — | Ψ VI | C₁₈H₃₇ | — | — | L II | H | — |
| D + 53 | Φ VI | C₁₈H₃₇ | — | 6-Cl | Ψ VI | C₁₈H₃₇ | — | 6-Cl | L III | H | — |
| D + 54 | Φ VI | C₈H₁₇ | — | 6-Cl | Ψ VI | C₈H₁₇ | — | 6-Cl | L III | N(C₆H₅)₂ | — |
| D + 55 | Φ VI | C₁₈H₃₇ | — | 6-Cl | Ψ VI | C₁₈H₃₇ | — | 6-Cl | L III | N(C₆H₅)₂ | — |
| D + 56 | Φ VI | CH₂CH₂OH | — | — | Ψ II | CH₂CH₂OH | — | — | L II | H | — |
| D + 57 | Φ VI | C₂H₅ | — | — | Ψ VI | C₂H₅ | — | — | L III | N(C₆H₅)₂ | — |
| D + 58 | Φ VIII | C₂H₅ | — | — | Ψ VIII | C₂H₅ | — | — | L III | N(C₆H₅)₂ | — |
| D + 59 | Φ IX | C₂H₅ | — | — | Ψ IX | C₂H₅ | — | — | L III | 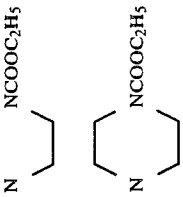 | — |
| D + 60 | Φ VI | C₂H₅ | — | — | Ψ IV | C₂H₅ | — | — | L III | 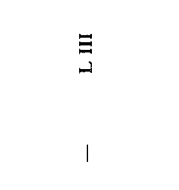 | — |
| D + 61 | Φ VI | CH₃ | — | — | Ψ III | CH₃ | CH₃ | — | L II | H | — |
| D + 62 | Φ VI | C₄H₉ | — | — | Ψ III | C₄H₉ | CH₃ | — | L III | H | — |
| D + 63 | Φ XIII | CH₃ | — | — | Ψ III | CH₃ | CH₃ | — | L II | N(C₆H₅)₂ | 0 |
| D + 64 | Φ VI | C₄H₉ | — | — | Ψ III | C₄H₉ | CH₃ | — | L III | H | — |
| D + 65 | Φ XIII | CH₃ | — | — | Ψ III | CH₃ | CH₃ | — | L II | H | 0 |
| D + 66 | Φ XIII | CH₂CH₂OCOCH₃ | — | — | Ψ III | CH₂CH₂OCOCH₃ | CH₃ | — | L III | H | — |
| D + 67 | Φ XI | CH₃ | — | — | Ψ I | CH₃ | CH₃ | — | L III | N(C₆H₅)₂ | 0 |
| D + 68 | Φ VI | CH₃ | — | — | Ψ I | CH₃ | CH₃ | — | L II | H | — |
| D + 69 | Φ XIII | C₄H₉ | — | — | Ψ I | C₄H₉ | CH₃ | — | L III | H | — |
| D + 70 | Φ VI | C₈H₁₇ | — | — | Ψ I | C₈H₁₇ | CH₃ | — | L II | H | — |
| D + 71 | Φ XIII | C₄H₉ | — | — | Ψ I | C₄H₉ | CH₃ | — | L III | N(C₆H₅)₂ | — |
| D + 72 | Φ XIII | CH₃ | — | — | Ψ I | CH₃ | CH₃ | — | L VII | H | — |
| D + 73 | Φ VI | C₄H₉ | — | — | Ψ I | C₄H₉ | CH₃ | — | L II | H | — |
| D + 74 | Φ VI | C₈H₁₇ | — | — | Ψ I | C₈H₁₇ | CH₃ | — | L III | N(C₆H₅)₂ | — |
| D + 75 | Φ VI | CH₃ | — | — | Ψ I | CH₃ | CH₃ | — | L III | H | — |
| D + 76 | Φ XIII | C₂H₅ | — | — | Ψ I | C₂H₅ | CH₃ | — | L IV | Br | — |

Such cyanine dye cations are known in the art as the combinations with such acid anions as $I^-$, $Br^-$, $ClO_4^-$, $BF_4^-$,

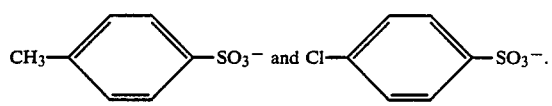

The combinations of cyanine dye cations with acid anions can easily be synthesized by following the methods as mentioned in the foregoing.

As the quencher anion for the formation of the ionic combinations, various quencher anions may be used. Particular preference is given to the anions of transition metal chelate compounds due to their capability of reducing deterioration by reading and exhibiting satisfactory compatibility with respect to the dye-bonded resin. Preferable central metals in this case are Ni, Co, Cu, Mn, Pd, Pt or the like. The compounds enumerated below are particularly desirable transition metal chelate compounds.

(1) Compounds of the bisphenyldithiol type represented by the following formula:

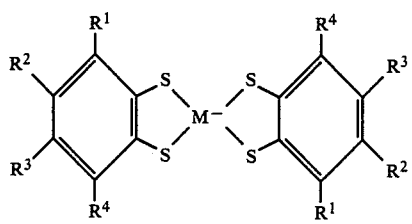

wherein $R^1$ through $R^4$ each denote a hydrogen atom, an alkyl group such as methyl group or ethyl group, a halogen atom such as Cl, or an amino group such as dimethylamino group or diethylamino group and M denotes a transition metal atom such as Ni, Co, Cu, Pd or Pt, preferably Ni.

Other ligands may be bound to the upper and lower positions of M.

Concrete examples of the type described above are as follows.

|  | $R^1$ | $R^2$ | $R^3$ | $R^4$ | M |
|---|---|---|---|---|---|
| Q⁻ 1-1 | H | H | H | H | Ni |
| Q⁻ 1-2 | H | CH₃ | H | H | Ni |
| Q⁻ 1-3 | H | Cl | Cl | H | Ni |
| Q⁻ 1-4 | CH₃ | H | H | CH₃ | Ni |
| Q⁻ 1-5 | CH₃ | CH₃ | CH₃ | CH₃ | Ni |
| Q⁻ 1-6 | H | Cl | H | H | Ni |
| Q⁻ 1-7 | Cl | Cl | Cl | Cl | Ni |
| Q⁻ 1-8 | H | Cl | Cl | Cl | Ni |
| Q⁻ 1-9 | H | H | H | H | Co |
| Q⁻ 1-10 | H | CH₃ | CH₃ | H | Co |
| Q⁻ 1-11 | H | CH₃ | CH₃ | H | Ni |
| Q⁻ 1-12 | H | N(CH₃)₂ | H | H | Ni |
| Q⁻ 1-13 | H | N(CH₃)₂ | N(CH₃)₂ | H | Ni |
| Q⁻ 1-14 | H | N(CH₃)₂ | CH₃ | H | Ni |
| Q⁻ 1-15 | H | N(CH₃)₂ | Cl | H | Ni |
| Q⁻ 1-16 | H | N(C₂H₅)₂ | H | H | Ni |

(2) Compounds of the bisdithiol-α-diketone type represented by the following formula:

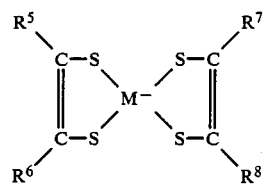

wherein $R^5$ through $R^8$ each denote a substituted or unsubstituted alkyl group or aryl group and M denotes a transition metal atom such as Ni, Co, Cu, Pd or Pt.

In the foregoing description, ph shall denote a phenyl group, $\phi$ a 1,4-phenylene group, $\Phi'$ a 1,2-phenylene group, and benz shall denote the formation of a condensed benzene ring by mutual bonding of two adjacent groups on a ring.

|  | $R^5$ | $R^6$ | $R^7$ | $R^8$ | M |
|---|---|---|---|---|---|
| Q⁻ 2-1 | φN(CH₃)₂ | ph | φN(CH₃)₂ | ph | Ni |
| Q⁻ 2-2 | ph | ph | ph | ph | Ni |
| Q⁻ 2-3 | φN(C₂H₅)₂ | ph | φN(C₂H₅)₂ | ph | Ni |

(3) Compounds represented by the following formula:

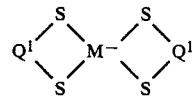

wherein M denotes a transition metal atom and $Q^1$ denotes

| $-C=O(Q^{11})$ or $-C-CN(Q^{12})$ | |
|---|---|
| $-C=O$ | $-C-CN$ |

|  | M | Q |
|---|---|---|
| Q⁻3-1 | Ni | Q¹² |
| Q⁻3-2 | Ni | Q¹² |
| Q⁻3-3 | Co | Q¹² |
| Q⁻3-4 | Cu | Q¹² |
| Q⁻3-5 | Pd | Q¹² |

(4) Compounds represented by the following formula:

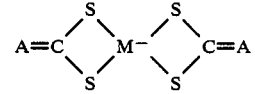

wherein M denotes a transition metal atom, A denotes S,

C, $Q^2$, $R^{11}$ and $R^{12}$ each denote CN, $COR^{13}$, $COOR^{14}$, $CONR^{15}$, $R^{16}$ or $SO_2R^{17}$, $R^{13}$ through $R^{17}$ each denote a hydrogen atom, a substituted or unsubstituted alkyl group or aryl group, and $Q^2$ denotes an atomic group necessary for the formation of a five-member or six-member ring.

| | M | A |
|---|---|---|
| Q⁻-4-1 | Ni | S |
| Q⁻-4-2 | Ni | S |
| Q⁻-4-3 | Ni | C(CN)(CN) |
| Q⁻-4-4 | Ni | C(CN)$_2$ |
| Q⁻-4-5 | Ni | C(CN)$_2$ |
| Q⁻-4-6 | Ni | C(CONH$_2$)(CN) |

(5) Compounds represented by the following formula:

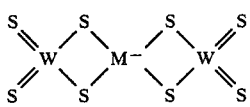

wherein M denotes a transition metal atom.

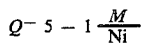

The compounds disclosed in Japanese Patent Application No. SHO 58(1983)-127,075 are other concrete examples.

(6) Compounds of the thiocatechol chelate type represented by the following formula:

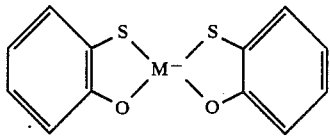

wherein M denotes a transition metal atom such as Ni, Co, Cu, Pd or Pt. Optionally, the benzene ring may possess a substituent.

(7) Compounds represented by the following formula:

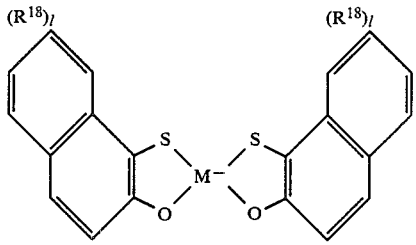

wherein $R^{18}$ denotes a monovalent group, l denotes an integer of 0 to 6, and M denotes a transition metal atom.

| | M | $R^{18}$ | l |
|---|---|---|---|
| Q⁻ 7-1 | Ni | H | 0 |
| Q⁻ 7-2 | Ni | CH$_3$ | 1 |

(8) Compounds of the thiobisphenolate chelate type represented by the following formula:

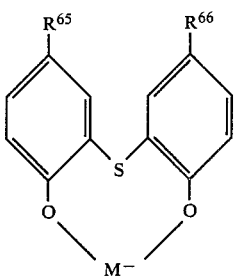

wherein M has the same meaning as defined above and $R^{65}$ and $R^{66}$ each denote an alkyl group.

| | $R^{65}, R^{66}$ | M |
|---|---|---|
| Q⁻ 8-1 | t-C$_8$H$_{17}$ | Ni |
| Q⁻ 8-2 | t-C$_8$H$_{17}$ | Co |

In all the quencher anions enumerated above, those of the bis phenyldithiol type given in (1) above prove to be most desirable. This is because they suffer deterioration by reading light to a decisively small extent and exhibit extremely high resistance to light.

Now, concrete examples of the photostable cyanine dye of this invention will be cited below.

| | D⁺ | Q⁻ |
|---|---|---|
| S 1 | D⁺ 1 | Q⁻ 1-8 |
| S 2 | D⁺ 1 | Q⁻ 1-12 |
| S 3 | D⁺ 2 | Q⁻ 1-12 |
| S 4 | D⁺ 1 | Q⁻ 1-3 |
| S 5 | D⁺ 3 | Q⁻ 1-8 |
| S 6 | D⁺ 3 | Q⁻ 1-12 |
| S 7 | D⁺ 4 | Q⁻ 1-8 |
| S 8 | D⁺ 5 | Q⁻ 1-8 |
| S 9 | D⁺ 6 | Q⁻ 1-8 |
| S 10 | D⁺ 7 | Q⁻ 1-8 |
| S 11 | D⁺ 7 | Q⁻ 1-2 |
| S 12 | D⁺ 8 | Q⁻ 1-12 |
| S 13 | D⁺ 9 | Q⁻ 1-12 |
| S 14 | D⁺ 10 | Q⁻ 1-12 |
| S 15 | D⁺ 11 | Q⁻ 1-12 |
| S 16 | D⁺ 3 | Q⁻ 1-7 |
| S 17 | D⁺ 12 | Q⁻ 1-12 |
| S 18 | D⁺ 13 | Q⁻ 1-13 |
| S 19 | D⁺ 14 | Q⁻ 1-14 |
| S 20 | D⁺ 15 | Q⁻ 1-15 |
| S 21 | D⁺ 16 | Q⁻ 1-16 |
| S 22 | D⁺ 17 | Q⁻ 1-17 |
| S 23 | D⁺ 17 | Q⁻ 1-17 |
| S 24 | D⁺ 18 | Q⁻ 1-18 |
| S 25 | D⁺ 18 | Q⁻ 1-18 |
| S 26 | D⁺ 1 | Q⁻ 1-1 |
| S 27 | D⁺ 1 | Q⁻ 1-2 |
| S 28 | D⁺ 1 | Q⁻ 1-13 |
| S 29 | D⁺ 1 | Q⁻ 1-14 |
| S 30 | D⁺ 19 | Q⁻ 1-8 |
| S 31 | D⁺ 20 | Q⁻ 1-8 |
| S 32 | D⁺ 20 | Q⁻ 1-12 |
| S 33 | D⁺ 21 | Q⁻ 1-8 |
| S 34 | D⁺ 21 | Q⁻ 1-12 |
| S 35 | D⁺ 21 | Q⁻ 1-7 |
| S 36 | D⁺ 19 | Q⁻ 1-12 |
| S 37 | D⁺ 3 | Q⁻ 1-7 |
| S 38 | D⁺ 9 | Q⁻ 1-8 |
| S 39 | D⁺ 9 | Q⁻ 1-7 |
| S 40 | D⁺ 9 | Q⁻ 1-2 |
| S 41 | D⁺ 9 | Q⁻ 1-13 |
| S 42 | D⁺ 22 | Q⁻ 1-8 |
| S 43 | D⁺ 22 | Q⁻ 1-12 |

-continued

| | D+ | Q− |
|---|---|---|
| S 44 | D+ 11 | Q− 1-8 |
| S 45 | D+ 11 | Q− 1-2 |
| S 46 | D+ 11 | Q− 1-7 |
| S 47 | D+ 11 | Q− 1-13 |
| S 48 | D+ 23 | Q− 1-8 |
| S 49 | D+ 24 | Q− 1-2 |
| S 50 | D+ 1 | Q− 1-3 |
| S 51 | D+ 3 | Q− 3-1 |
| S 52 | D+ 2 | Q− 2-1 |
| S 53 | D+ 4 | Q− 8-1 |
| S 54 | D+ 6 | Q− 7-1 |
| S 55 | D+ 5 | Q− 5-2 |
| S 56 | D+ 7 | Q− 6-1 |
| S 57 | D+ 8 | Q− 7-1 |
| S 58 | D+ 9 | Q− 4-1 |
| S 59 | D+ 11 | Q− 1-3 |
| S 60 | D+ 25 | Q− 1-8 |
| S 61 | D+ 26 | Q− 1-8 |
| S 62 | D+ 27 | Q− 1-8 |
| S 63 | D+ 28 | Q− 1-8 |
| S 64 | D+ 29 | Q− 1-8 |
| S 65 | D+ 27 | Q− 1-12 |
| S 66 | D+ 25 | Q− 1-14 |
| S 67 | D+ 26 | Q− 1-7 |
| S 68 | D+ 30 | Q− 1-8 |
| S 69 | D+ 31 | Q− 1-12 |
| S 70 | D+ 32 | Q− 1-8 |
| S 71 | D+ 34 | Q− 1-8 |
| S 72 | D+ 35 | Q− 1-8 |
| S 73 | D+ 36 | Q− 1-12 |
| S 74 | D+ 37 | Q− 1-12 |
| S 75 | D+ 38 | Q− 1-8 |
| S 76 | D+ 38 | Q− 1-12 |
| S 77 | D+ 38 | Q− 1-7 |
| S 78 | D+ 39 | Q− 1-8 |
| S 79 | D+ 40 | Q− 1-2 |
| S 80 | D+ 41 | Q− 1-14 |
| S 81 | D+ 42 | Q− 1-13 |
| S 82 | D+ 43 | Q− 1-7 |
| S 83 | D+ 44 | Q− 1-3 |
| S 84 | D+ 45 | Q− 1-8 |
| S 85 | D+ 46 | Q− 1-12 |
| S 86 | D+ 47 | Q− 1-2 |
| S 87 | D+ 48 | Q− 1-14 |
| S 88 | D+ 49 | Q− 1-14 |
| S 89 | D+ 50 | Q− 1-12 |
| S 90 | D+ 51 | Q− 1-12 |
| S 91 | D+ 52 | Q− 1-3 |
| S 92 | D+ 53 | Q− 1-7 |
| S 93 | D+ 29 | Q− 1-7 |
| S 94 | D+ 55 | Q− 1-7 |
| S 95 | D+ 56 | Q− 1-2 |
| S 96 | D+ 57 | Q− 1-14 |
| S 97 | D+ 58 | Q− 1-7 |
| S 98 | D+ 59 | Q− 1-8 |
| S 99 | D+ 60 | Q− 1-3 |
| S 100 | D+ 61 | Q− 1-13 |
| S 101 | D+ 62 | Q− 1-14 |
| S 102 | D+ 63 | Q− 1-2 |
| S 103 | D+ 64 | Q− 1-7 |
| S 104 | D+ 65 | Q− 1-2 |
| S 105 | D+ 66 | Q− 1-3 |
| S 106 | D+ 67 | Q− 1-8 |
| S 107 | D+ 68 | Q− 1-8 |
| S 108 | D+ 69 | Q− 1-8 |
| S 109 | D+ 70 | Q− 1-12 |
| S 110 | D+ 71 | Q− 1-8 |
| S 111 | D+ 72 | Q− 1-2 |
| S 112 | D+ 73 | Q− 1-14 |
| S 113 | D+ 74 | Q− 1-7 |
| S 114 | D+ 75 | Q− 1-3 |
| S 115 | D+ 76 | Q− 1-12 |
| S 116 | D+ 27 | Q− 2-1 |
| S 117 | D+ 30 | Q− 1-3 |
| S 118 | D+ 33 | Q− 3-1 |
| S 119 | D+ 38 | Q− 4-1 |
| S 120 | D+ 39 | Q− 5-2 |
| S 121 | D+ 41 | Q− 7-1 |
| S 122 | D+ 42 | Q− 6-1 |
| S 123 | D+ 44 | Q− 8-1 |
| S 124 | D+ 1 | Q− 1-5 |
| S 125 | D+ 1 | Q− 2-1 |

Such a photostabilized cyanine dye of the present invention is produced as follows.

First, a cationic cyanine dye having an anion bonded thereto is prepared.

In this case, the anion (An−) can be any one member selected from among I−, Br−, ClO4−, BF4−,

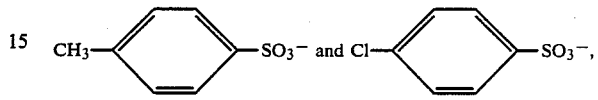

for example.

Thus, the cyanine dye is a known substance and can be synthesized by the ordinary method, as already mentioned.

Separately, an anionic quencher having a cation bonded thereto is prepared. In this case, the cation (Cat+) is preferred to be a tetraalkyl ammonium such as N+(CH3)4 or N+(C4H9)4, for example.

This quencher can be synthesized by following the disclosure of Japanese Patent Application No. SHO 57(1982)-166,832 or Japanese Patent Application No. SHO 58(1983)-163,080.

Then, the cyanine dye and the quencher described above are dissolved in equal mols in a polar organic solvent. The polar organic solvent to be used is desired to be N,N-dimethyl formamide, for example.

The concentrations of the solutes are desired to be preferably about 0.01 mol/liter.

Subsequently, the resultant solution is mixed with an aqueous solvent, preferably water, to induce double decomposition and subsequent precipitation. The amount of water so added is desired to be a large excess of at least 10 times the amount of the solution.

The reaction temperature is desired to fall in the range of about room temperature to 90° C.

If required, the aforesaid procedures may be repeated.

Subsequently, both liquid phases are separated from each other, followed by filtration and drying. Recrystallization with DMF-ethanol, etc. then yields a photostabilized cyanine dye.

It should be noted that, for the same purpose, a neutral intermediate of the quencher cation may be dissolved in methylene chloride, etc., and an equimole of the cyanine dye may be added to the resulting solution, followed by concentration and recrystallization.

According to the teachings of Japanese Patent Application No. SHO 57(1982)-166,832, nickel may be oxidized, while air is blown in, to form an anion type salt.

It should be noted that the combinations of the present invention may also be prepared according to the teachings of Japanese Patent Application No. SHO 59(1984)-18,878. More concretely, the combinations of the present invention are synthesized in the following manner.

Synthesis Example 1 (Synthesis of S1)

In 20 ml of N,N-dimethylformamide, 1,3,3,1′,3′,3-hexamethylindolino-tricarbocyanine-iodide (iodide of D+1, NK-125, manufactured by Nippon Kankoshikiso Kenkyusho) (0.0005 mol, 0.25 g) and bis (3,4,6-trichloro-1,2-dithiophenolate)-nickel (II) tetra-n-butyl ammonium (tetrabutyl ammonium salt ($Q^{-1-8}$, PA-1006, manufactured by Mitsui-Toatsu Chemical) were dissolved and left reacting at 70° C. for three hours.

After the reaction, the resultant reaction product solution was poured into cold water for precipitation. The precipitate thus formed was separated by filtration, washed with water, and dried under vacuum to obtain 1,3,3,1′,3′,3′-hexamethylindolino-tricarbocyanine-bis(3,4,6-trichloro-1,2-dithiophenolate)nickel (II).

Amount of product: 0.40 g (88% yield).

This product was again dissolved with heat in 10 ml of DMF, and 30 ml of hot ethanol were added to the resulting solution, and allowed to stand for recrystallization.

M.P.: 206°–208° C. (reddish brown).

The Ni content of the product was determined by the atomic absorption method to obtain the following results.

(Ni content (%): Calculated: 6.15; Found: 6.07.

Calculated for 1:1 mixture of dye and stabilizer: 4.43.

Synthesis Example 2 (Synthesis of S5)

A photostabilized dye S5 was obtained by subjecting 1,3,3,1′,3′,3′-hexamethyl-4,5,4′,5′-dibenzoindotricarbocyanine perchlorate (0.00025 mol, 0.153 g ) (perchlorate of $D^{+3}$, HDITC-15073, manufactured by E. Kodak) and PA-1006 (0.00025 mol, 0.197 g) (tetrabutyl ammonium salt of $Q^{-8}$) to double decomposition, following the procedure of Synthesis Example 1.

Amount of S5: 0.23 g (87% yield).

Recrystallization was effected from DMF-ethanol.

M.P.: 177°–179° C. (grayish green).

Ni content (%): Calculated: 5.56; Found: 5.54.

Calculated for mixture: 4.2.

Synthesis Example 3 (Synthesis of S2)

A photostabilized dye S2 was obtained from iodide of $D^{+1}$ (NK-125 manufactured by Nippon Kankoshikiso Kenkyusho) and a tetrabutyl ammonium salt of $Q^{-1-12}$ (NIR C-2 manufactured by Teikoku Kagaku Sangyo K.K.) according to the procedure of Example 1.

Yield: 91%.

M.P.: Gradually decomposed (black).

Ni content (%): Calculated: 7.04; Found: 6.93.

Synthesis Example 4 (Synthesis of S3)

A photostabilized dye S3 was obtained, using a perchlorate of $D^{+2}$ (NK-2905, manufactured by Nippon Kankoshikiso Kenkyusho) and a tetrabutyl ammonium salt of $Q^{-1-12}$ (NIR C-2, manufactured by Teikoku Kagaku Sangyo K.K.) according to Synthesis Example 1.

Yield: 80%.

M.P.: 240° C. (decomposed) (blackish green).

Ni content (%): Calculated: 4.85; Found: 4.77.

Synthesis Example 5 (Synthesis of S4)

A photostabilized dye S4 was obtained, using an iodide of $D^{+1}$ (NK-125, manufactured by Nippon Kankoshikiso Kenkyusho) and a tetrabutyl ammonium salt of $Q^{-1-3}$ (PA-1005, manufactured by Mitsui Toatsu) according to Synthesis Example 1.

Yield: 95%.

M.P.: 219°–220° C. (green).

Ni content (%): Calculated: 6.63; Found: 6.51.

Synthesis Example 6 (Synthesis of S6)

A photostabilized dye SD6 was obtained, using a perchlorate of $D^{+3}$ (15073, manufactured by E. Kodak) and a tetrabutyl ammonium salt of $Q^{-1-12}$ according to Synthesis Example 1.

Yield: 89%.

M.P.: 210°–212° C. (deep green).

Ni content (%): Calculated: 6.28; Found: 6.41.

Synthesis Example 7 (Synthesis of S7)

A photostabilized dye S7 was obtained, using a perchlorate of $D^{+4}$ (NK-2865, manufactured by Nippon Kankoshikiso Kenkyusho) and a tetrabutyl ammonium salt of $Q^{-1-8}$ according to Synthesis Example 1.

Yield: 75%.

M.P.: 137°–140° C. (blackish green).

Ni content (%): Calculated: 4.69; Found: 4.10.

Synthesis Example 8 (Synthesis of S8)

A photostabilized dye D8 was obtained, using a perchlorate of $D^{+5}$ (NK-2866, manufactured by Nippon Kankoshikiso Kenkyusho) and a tetrabutyl ammonium salt of $Q^{-1-8}$ according to Synthesis Example 1.

Yield: 88%.

M.P.: 73°–75° C. (blackish green).

Ni content (%): Calculated: 3.83; Found: 4.22.

Synthesis Example 9 (Synthesis of S9)

A photostabilized dye S9 was obtained, using a perchlorate (NK-2873, manufactured by Nippon Kankoshikiso Kenkyusho) and a tetrabutyl ammonium salt of $Q^{-1-8}$ according to Synthesis Example 1.

Yield: 100%.

M.P.: 217°–218° C. (reddish purple).

NI content (%): Calculated: 4.70; Found: 4.55.

Synthesis Example 10 (Synthesis of S10)

A photostabilized dye S10 was obtained, using a bromide of $D^{+7}$ (NK-2902, manufactured by Nippon Kankoshikiso Kenkyusho) and a tetrabutyl ammonium salt of $Q^{-1-8}$ according to Synthesis Example 1.

Yield: 92%.

M.P.: Gradually decomposed (deep green).

Ni content (%): Calculated: 4.90; Found: 4.88.

Synthesis Example 11 (Synthesis of S11)

A photostabilized dye S11 was obtained, using a bromide of $D^{+7}$ (NK-2902, manufactured by Nippon Kankoshikiso Kenkyusho) and a tetrabutyl ammonium salt of $Q^{-1-2}$ (NIR C-1, manufactured by Teikoku Kagaku Sangyo) according to Synthesis Example 1.

Yield: 97%.

M.P.: 183°–184° C. (blackish green).

Ni content (%): Calculated: 5.75; Found: 5.88.

Synthesis Example 12 (Synthesis of S12)

A photostabilized dye S12 was obtained, using a perchlorate of $D^{+8}$ (NK-2910, manufactured by Nippon Kankoshikiso Kenkyusho) and a tetrabutyl ammonium salt of $Q^{-1-12}$ according to Synthesis Example 1.

Yield: 81%.

M.P.: 193°–194° C. (deep green).

Ni content (%): Calculated: 4.62; Found: 4.75.

Synthesis Example 13 (Synthesis of S13)

A photostabilized dye S13 was obtained, using a perchlorate of $D^{+9}$ (NK-2921, manufactured by Nippon Kankoshikiso Kenkyusho) and a tetrabutyl ammonium salt of $Q^-1$-12 according to Synthesis Example 1.

Yield: 88%.
M.P.: 140° C. (decomposed) (blackish green).
Ni content (%): Calculated: 5.57; Found: 5.48.

Synthesis Example 14 (Synthesis of S15)

A photostabilized dye S15 was obtained, using a perchlorate of $D^+11$ (NK-2880, manufactured by Nippon Kankoshikiso Kenkyusho) and a tetrabutyl ammonium salt of $Q^-1$-12 according to Synthesis Example 1.

Yield: 96%.
M.P.: 209° C. (bright orange).
Ni content (%): Calculated: 6.28; Found: 6.32.

Synthesis Example 15 (Synthesis of S16)

A photostabilized dye S16 was obtained, using a perchlorate of $D^+3$ (HDITC-15073, manufactured by E. Kodak) and a tetrabutyl ammonium salt of $Q^-1$-7 (PA-1003, manufactured by Mitsui Toatsu) according to Synthesis Example 1.

Yield: 71%.
M.P.: 200°-201° C. (green).
Ni content (%): Calculated: 5.22; Found: 5.21.

It should be noted that the values of $\lambda_{max}$ of the absorption spectra of the respective photostabilized dyes were substantially the same as those of the starting cyanine dyes.

It is desired that the amount of the combinations to be included be in a range of 10 to 80 wt %, more preferably 30 to 60 wt %.

When the optical recording media contain the combinations in an amount exceeding 80 wt %, they have reduced or limited absorption and reflectance. They have also poor compatibility and film-forming properties, resulting in a lowering of S/N ratios, etc. and, hence, sensitivity. When the amount of the combinations is less than 10 wt %, the anion moiety of the quencher is limited, thus giving rise to deterioration by reading or reproduction. Unnecessary anion is also present in the recoridng layer. For that reason, hydrolysis takes place, thus leading ready formation of acids, alkalis, etc. and, hence, a drop of moisture resistance.

If required, the recording layer may contain a resin.

Preferably, the resin used this end may include an autoxidizable resin, depolymerizable resin or thermoplastic resin.

Among the resins, the particularly preferable thermoplastic resins are as follows.

(i) Polyolefins

Polyethylene, polypropylene and poly-4-methylpentene-1.

(ii) Polyolefin copolymers

Ethylene-vinyl acetate copolymer, ethylene-acrylate copolymers, ethylene-acrylic acid copolymer, ethylene-propylene copolymer, ethylene-butene-1 copolymer, ethylene-maleic anhydride copolymer, and ethylene-propylene terpolymer (EPT).

Th copolymerizing ratios of comonomers in such copolymers are optional.

(iii) Vinyl chloride copolymers

Vinyl acetate-vinyl chloride copolymer, vinyl chloride-vinylidene chloride copolymer, vinyl chloride-maleic anhydride copolymer, copolymers of acrylic esters or methacrylic esters with vinyl chloride, acrylonitrile-vinyl chloride copolymer, vinyl chloride-vinyl ether copolymer, ethylene- or propylene-vinyl chloride copolymer and ethylene-vinyl acetate copolymer having vinyl chloride graft polymerized thereto.

In this case, the polymerizing ratios of comonomers in such copolymers are optional.

(iv) Vinylidene chloride copolymers

Vinylidene chloride-vinyl chloride copolymer, vinylidene chloride-vinyl chloride-acrylonitrile copolymer and vinylidene chloride-butadiene-vinyl halide copolymer.

In this case, the copolymerizing ratios of comonomers in such copolymers are optional.

(v) Polystyrene (vi) Styrene copolymers

Styrene-acrylonitrile copolymer (AS resin), styrene-acrylonitrile-butadiene copolymer (ABS resin), styrene-maleic anhydride copolymer (SMA resin), styrene-acrylic ester-acrylamide copolymers, styrene-butadiene copolymer (SBR), styrene-vinylidene chloride copolymer and styrene-methyl methacrylate copolymer.

In this case, the copolymerizing ratios of comonomers in such copolymers may be optional.

(vii) Styrenic polymers

α-Methylstyrene, p-methylstyrene, 2,5-dichlorostyrene, α,β-vinyl naphthalene, α-vinyl pyridine, acenaphthene and vinyl anthracene, and copolymers thereof such as, for example, copolymer of α-methylstyrene with methacrylic ester.

(viii) Coumarone-indene resin

Coumarone-indene-styrene copolymer.

(ix) Terpene resin or picolite

Terpene resin which is the polymer of limonene derived from α-pinene and picolite derived from β-piene.

(x) Acrylic resin

Particularly acrylic resin of the type containing an atomic group represented by the following formula proves desirable.

Formula

In the formula given above, $R_{10}$ stands for a hydrogen atom or an alkyl group and $R_{20}$ for a substituted or unsubstituted alkyl group. In this case, $R_{10}$ of the foregoing formula is desired to be a hydrogen atom or a lower alkyl group having 1 to 4 carbon atoms. Preferably $R_{10}$ is a hydrogen atom or methyl group. $R_{20}$ may be a substituted or unsubstituted alkyl group and the number of carbon atoms in the alkyl moiety is desired to fall in the range of 1 to 8. When $R_{20}$ is a substituted alkyl group, the substituent thereof is desired to be hydroxyl group, halogen atom or an amino group (particularly a dialkylamino group).

The atomic group represented by the foregoing formula may form a copolymer with other repeating atom group to give rise to a varying acrylic resin. Generally, however, the acrylic resin is formed by obtaining a homopolymer or copolymer using at least one atom group of the aforementioned formula as a repeating unit.

(xi) Polyacrylonitrile (xii) Acrylonitrile copolymers

Acrylonitrile-vinyl acetate copolymer, acrylonitrile-vinyl chloride copolymer, acrylonitrile-styrene copolymer, acrylonitrile-vinylidene chloride copolymer, acrylonitrile-vinyl pyridine copolymer, acrylonitrile-methyl methacrylate copolymer, acrylonitrile-butadiene copolymer and acrylonitrile-butyl acrylate copolymer.

In this case, the copolymerizing ratios of comonomers in these copolymers are optional.

(xiii) Diacetone acrylamide polymers

Diacetone acrylamide polymer obtained by the action of acetone upon acrylonitrile.

(xiv) Polyvinyl acetate (xv) Vinyl acetate copolymers

Copolymers of vinyl acetate with acrylic esters, vinyl ether, ethylene and vinyl chloride.

In this case, the copolymerizing ratios of comonomers in these copolymers are optional.

(xvi) Polyvinyl ethers

Polyvinyl methyl ether, polyvinyl ethyl ether and polyvinyl butyl ether.

(xvii) Polyamides

Ordinary homonylons such as nylon 6, nylon 6-6, nylon 6-10, nylon 6-12, nylon 9, nylon 11, nylon 12, and nylon 13, polymers such as nylon 6/6-6/6-10, nylon 6/6-6/12, and nylon 6/6-6/11, and optionally modified nylons.

(xviii) Polyesters

Condensates and copolycondensates of various dibasic acids such as aliphatic dibasic acids like oxalic acid, succinic acid, maleic acid, adipic acid and sebatic acid, and aromatic dibasic acids like isophthalic acid and terephthalic acid with various glycols such as ethylene glycol, tetramethylene glycol and hexamethylene glycol.

Among other condensates and copolycondensates, condensates of aliphatic dibasic acids with glycols and copolycondensates of glycols with aliphatic dibasic acids prove particularly advantageous.

Further, modified Glyptal resins obtained by causing Glyptal resin, a condensate of phthalic anhydride with glycerol, to be esterified with a fatty acid and natural resin are advantageously usable.

(xix) Polyvinyl acetal type resins

Polyvinyl formal and polyvinyl acetal type resins obtained by acetalizing polyvinyl alcohols are advantageously usable.

In this case, the acetalizing degrees of polyvinyl acetal type resins are optional.

(xx) Polyurethane resins

Thermoplastic polyurethane resins possessing urethane bond.

Among other polyurethane resins, those obtained by the condensation of glycols with diisocyanates and preferably those obtained by the condensation of alkylene glycols with alkylene diisocyanates prove advantageously usable.

(xxi) Polyethers

Styrene formalin resin, ring-opened polymer of cyclic acetal, polyethylene oxide and glycol, polypropylene oxide and glycol, propylene oxide-ethylene oxide copolymer and polyphenylene oxide.

(xxii) Cellulose derivatives

Nitrocellulose, acetyl cellulose, ethyl cellulose, acetyl-butyl cellulose, hydroxyethyl cellulose, hydroxypropyl cellulose, methyl cellulose, ethyl hydroxyethyl cellulose, various esters and ethers of cellulose and mixtures thereof.

(xxiii) Polycarbonates

Various polycarbonates such as polydioxy-diphenyl methane carbonate and dioxy-diphenyl propane carbonate.

(xxiv) Ionomers

Na, Li, Zn and Mg salts of copolymers of methacrylic acid and acrylic acid with ethylene.

(xxv) Ketone resins

Condensates of cyclic ketones such as cyclohexanone and acetophenone with formaldehyde.

(xxvi) Xylene resins

Condensates of m-xylene and mesitylene respectively of formalin and modified products of such condensates.

(xxvii) Petroleum resins $C_5$ type, $C_9$ type and $C_5$–$C_9$ type copolymers, dicyclopentadiene type resins and copolymers thereof, and modified products of such copolymers.

(xxviii) Blends of two or more members selected from the foregoing classes (i) through (xxvii) and blends of such members with other thermoplastic resins.

It is to be understood that the molecular weight, etc. of the resins may be varied widely.

The resins may usually be used with the aforesaid combinations in a wide weight ratio of 1:0.1 to 100.

The recording layers 2 and 2' used in the present invention contain the mixtures of the cyanine dye as mentioned above with the combinations of the cyanine dye cations with the quencher anions, but the most preference is given to the incorporation of a mixture of an indolenine base cyanine dye with a combination of indolenine base cyanine dye cation with quencher anion.

In this case, so satisfactory are the solubility and film-forming properties of the recording layer composition that much marked improvements are introduced into S/N ratios etc.

The optical recording medium containing such a recording layer can also be stored in the presence of light with no drop of the properties due to its limited degradation by reading light and improved light resistance.

Figure 3:
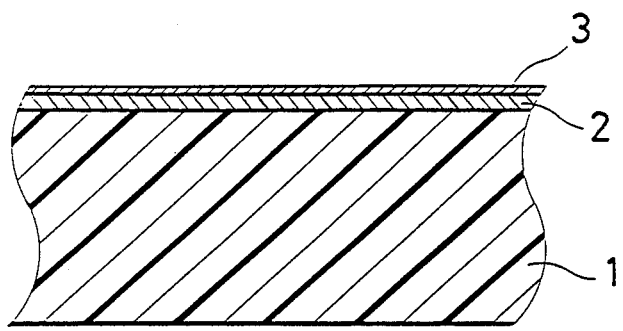
Figure 4:
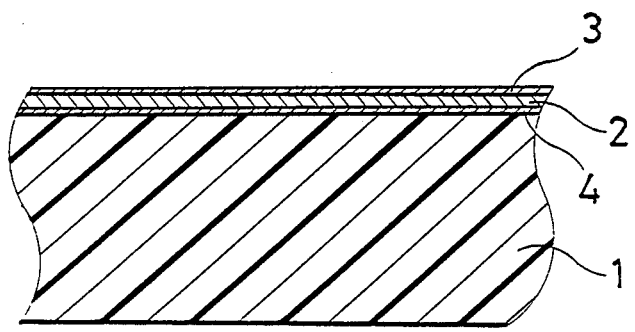

As illustrated in FIGS. 1 and 3, the recording layers 2 and 2' may be provided directly onto the substrates 1 and 1'. Alternatively, they may be applied onto underlying layers 3 and 3' previously provided onto the substrates 1 and 1', as illustrated in FIGS. 2 and 4 to 6. In the present invention, the latter case represents a more preferable embodiment.

Usually, the recording layers 2 and 2' each have a thickness of about 0.03 to 2 microns.

It is preferred that the recording layers 2 and 2' each have a thickness of 0.04 to 0.12 microns, particularly 0.05 to 0.08 microns.

In a thickness of up to 0.04 microns, particularly 0.05 microns, so small are both absorption and reflectance that it is impossible to increase both writing sensitivity and reading sensitivity.

Figure 6:
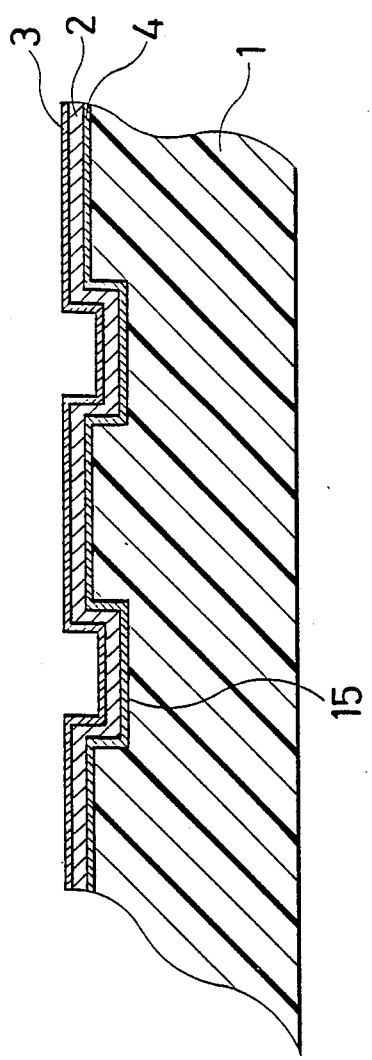
FIG. 6 is a partly sectioned view showing a still further embodiment of the optical recording media according to the present invention.

In a thickness exceeding 0.12 microns, difficulty is involved in obtaining any tracking signal, since burying of a pregroove 15 (to be described later), as shown in FIG. 6, takes place. It is also not easy to form pits, and there is a drop of reading sensitivity.

Such recording layers may further contain other dyes, other polymers or oligomers, various plasticizers, surfactants, antistatics, lubricants, fire retardants, stabilizers, dispersants, antioxidants, crosslinkers and other agents.

It is to be noted that the solvents used for the application of the layers 2 and 2' include ketones such as methyl ethylketone, methyl isobutyl ketone and cyclohexane, esters such as butyl acetate, ethyl acetate, carbitol acetate and butylcarbitol acetate, ethers such as methyl cellosolve and ethyl cellosolve, aromatic solvents such as toluene and xylene, halogenated alkyl solvents such as dichloroethane and alcohols.

The substrates 1 and 1' on which the recording layers 2 and 2' are to be provided may be formed of any material substantially transparent to writing and reading light (having a transmission of, preferablty, at least 80%). For instance, they may be formed of either resins or glasses.

Depending upon the purpose, the substrates may be in the form of tapes, discs, drums, belts or the like.

More preferably, the substrates 1 and 1' are formed of a resin.

To this end, various resins may be used, including, e.g., polymethyl methacrylate, acrylic resin, epoxy resin, polycarbonate resin, polysulfon resin, polyether sulfon or methyl pentene polymer. The substrates may or may not be provided with grooves. Particular preference is given to the use of acrylic or polycarbonate resin of extremely high transparency.

However, since the acrylic or polycarbonate resin is easily attached by such various coating solvents as mentioned above, in particular, ketones, esters or halogenated alkyl solvents, it is preferred that various underlying layers are provided. Especially, it should be noted that the provision of the underlying layer according to the present invention is greatly effective.

Since they are substantially transparent to writing and reading light, writing and reading can be carried out from the back surface side of the substrate. This is advantageous not only in view of sensitivity, S/N ratio, etc., but also in view of actual considerations such as dust prevention. Due to their good moldability, it is also easy to form a groove for tracking.

When acrylic resins are used, preference is given to copolymers or homopolymers composed mainly of methacrylates including a linear or cyclic alkyl group having 1–8 carbon atoms such as, for instance, polymethyl methacrylate.

Preferred polycarbonate resins are of the bisphenol A type.

The effect of the underlying layer according to the present invention becomes more noticeable, especially when the acrylic or polycarbonate resins are formed by injection molding.

It should be noted that, preferably, the substrate is previously provided with a tracking groove on the side thereof on which the recording layer is applied.

As illustrated in FIG. 6, a pregroove 15 for tracking is preferably formed in the recording layer 2 or 2' on the substrate 1 or 1'.

The pregroove 15 then has a depth of about $\lambda/8n$, particularly $\lambda/7n$ to $\lambda/12n$ (wherein n is the refractive index of the substrate). The pregroove 15 has a width nearly equal to a tracking width.

It is then preferred that writing and reading light is irradiated from the back surface side of the substrate, while using as the tracking portion the recording layer 2 or 2' positioned within the pregroove 15.

With such an arrangement it is possible to introduce improvements into writing sensitivity and reading S/N ratios and increase a control signal for tracking.

As shown in FIGS. 2 and 4 to 6, these substrates 1 and 1' are preferably provided thereon with underlying layers 3 and 3' to improve solvent resistance, wetting, surface tension and thermal conductivity as mentioned heretofore. There is no limit to the material to form the underlying layer. Any known layer may be employed as the underlying layer.

Thus, the underlying layer may be a vapor-deposited film based on inorganic materials such as various oxides, nitrides or carbides, for instance, silicon oxide, titanium oxide, aluminium oxide, magnesium oxide, zirconium oxide, silicon nitride, silicon carbide, etc.

Preferably are also hydrolysis coating films composed mainly of oxides, e.g., silicon oxide, titanium oxide, zirconium oxide, aluminium oxide, etc., which are formed by coating, heating and drying of chelate compounds known as the so-called crosslinkers, etc., such as, for example, organic complex compounds or organic polyfunctional compounds of Si, Ti, Al, Zr, In, Ni, Ta, etc.

It is to be appreciated that the most effective is a coating film of a colloidal particle dispersion of the silicon base condensate to be described later.

If the underlying layers 3 and 3' comprising such films are interposed between the substrates 1, 1' and the recording layers 2, 2', then the deterioration of the resinous substrates owing to the coating solvents are reduced or limited to a very small degree that a lowering of the reflectance of the recording layers is reduced or limited with considerable improvements in S/N ratios.

There is also no deterioration of reflectance with time during storage. Preferably, the colloidal particles of silicon base condensates may be those of hydrolysis condensates of halogenated silicon compounds, esp., silicon tetrachloride or alkyl silicates, esp., tetra-lower alkyl (methyl, ethyl) silicates.

The colloidal particles then have a particle size of 30 to 100 Å, in particular about 50 to 80 Å.

As the dispersion solvents use may be made of an alcohol, esp., a monovalent aliphatic alcohol, or an alkyl acetate, or a mixed solvent thereof with an aromatic hydrocarbon.

For hydrolysis, a mineral acid may be added, if required.

If required, a stabilizer or surfactant such as ethylene glycol and the like may further be added.

Referring to one example of such colloidal particle dispersion, Japanese Patent Publication SHO 31(1956)-6,533 teaches that silicon tetrachloride (SiCl$_4$) and a monovalent aliphatic alcohol is dissolved in an alkyl acetate. The underlying film consisting of such a coating film is applied thereon with the recording layer.

Use may be made of products obtained by adding 1 to 20 wt % of ethylene glycol to a solution comprising a tetraalkyl silicate and a monovalent aliphatic alcohol, an alkyl acetate and a mineral acid, as disclosed in Japanese Patent Publication SHO 36(1961)-4,740.

Use may further be made of an alcoholic solution of a tetra-lower alkyl silicate as disclosed in Japanese Patent Publication SHO 45(1970)-35,435.

The monovalent aliphatic alcohols used may include methyl alcohol, ethyl alcohol, a modified alcohol, isopropyl alcohol, butyl alcohol or mixtures thereof.

The alkyl acetates used may include methyl acetate, ethyl acetate, amyl acetate, butyl acetate or mixtures thereof.

The mineral acids used may include industrially available hydrochloric acid, sulfuric acid, etc.

It is to be understood that the dispersion may be applied by means of, e.g., spinner coating in the conventional manner.

Drying may then be carried out at 40°–80° C. for about 20 minutes to 2 hours.

The coating film formed in this manner is a silicon oxide film including a hydroxyl group.

Each of the underlying layers 3 and 3' has a thickness of 0.005 to 0.05 microns, more preferably 0.008 to 0.012 microns.

With the underlying layers 3 and 3' having a thickness of higher than 0.05 microns, any tracking signal cannot be obtained due to burying of the pregroove.

In the present invention, it is preferred that, as illustrated in FIGS. 2 and 4 to 6, surface layers 4 and 4' are provided on the sides of the recording layers 2 and 2' opposite to the underlying layers 3 and 3'.

The surface layers 4 and 4' may be formed of a variety of known materials, but they are preferably prepared in the quite same manner as the aforesaid underlying layers.

Each of the surface layers 4 and 4' has a thickness of 0.005 to 0.03 microns, more preferably 0.008 to 0.012 microns.

A surface layer having a thickness of less than 0.005 microns does not give rise to any optical recording medium which has improved writing and reading sensitivity.

When the surface layer has a thickness exceeding 0.03 microns, on the contrary, the writing and reading sensitivity of the resulting optical recording medium drops.

Pits are formed on each recording layer 2 or 2' simultaneously with light irradiation. Afterwards, the irradiated light is not absorbed at the central portion of that layer, on which the greatest energy is concentrated. This is responsible for a drop of the efficiency of the energy applied, and is attributable to the fact that sensitivity does not exceed a certain level.

According to the present invention, pitting is inhibited for a certain time of light irradiation by the provision of a high-melting hard film on the surface, and optionally, underlayer of the recording layer, especially on the surface thereof, with a view to effecting the formation of pits immediately upon a sufficient temperature being reached.

Usually, the underlying layer is directly provided thereon with the recording layer. If required or in some cases, however, an intermediate layer may additionally be provided between the underlying layer and the recording layer.

Similarly, the surface layer may additionally be provided thereon with a variety of the outermost protective layers, half-mirrors, etc.

The medium of the present invention may include the aforesaid recording layer 2 or 2' and, optionally, the surface layer 4 or 4' on one side of the substrate 1 or 1' through the uderlying layer 3 or 3', if required. Alternatively, that medium may include the aforesaid recording layer 2 and 2' and, optionally, the surface layes 4 and 4' on both sides of the substrate 1 or 1' through the underlying layers 3 and 3'.

Figure 5:
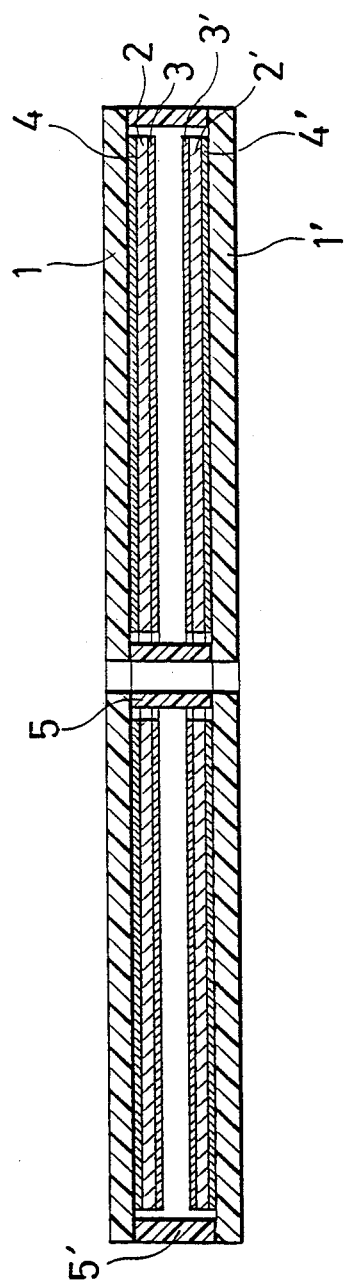
FIG. 5 is a sectioned view showing a further embodiment of the optical recording media of the present invention.

As illustrated in FIG. 5, two media including on the substrates 1 and 1' the recording layers 2 and 2' and, optionally, the surface layers 4 and 4' through the underlying layers 3 and 3+, if required, are arranged with the recording layers 2 and 2' facing each other at a given interval, and are closed up with the use of spacers 5 and 5' for dust- and flaw-proofness.

It is to be noted that, preferably, no reflective layer overlies the recording layer.

The medium of the present invention is irradiated with recording light in a pulsed manner, while it runs or turns.

At this time, the dye contained in the recording layer generates heat to decompose the autoxidizable resin or melt the thermoplastic resin and dye for pitting.

It is then preferred that writing is carried out from the back surface side of the substrate.

Especially when the tri- or tetra-carbocyanine dye is used, very satisfactory results can be obtained, if writing is carried out with a semiconductor laser, etc.

While the medium still runs or turns, the pits formed in this manner are read out by the detection of the reflected or transmitted light of the reading light having the aforesaid wavelength, in particular the reflected light.

It is then preferred that the substrate is again irradiated with reading light from the back surface side thereof for the detection of the reflected light.

It is to be appreciated that, when the thermoplastic resin is used for the recording layer, the pits previously formed in the recording layer may be erased by light or heat for re-writing.

It is also to be appreciated that a He-Ne laser, etc. may be used for recording or reading light.

It is further preferred that, at the time of writing or reading, tracking is done making use of the interference effect due to the aforesaid pregroove.

Industrial Usability

The optical recording medium according to the present invention can be stored in the presence of light with limited deterioration of the properties due to its limited degradation by reading light and improved light resistance, since it includes a recording layer consisting of a mixture of a cyanine dye and a combination of cyanine dye cation with quencher anion.

Due to its improved solubility and film-forming properties, the recording layer according to the present invention provides an optical recording medium which shows only a limited lowering of sensitivity or S/N ratio, as compared with that obtained from the combination alone or a mixture of dye with quencher.

The deterioration of the resinous substrate due to the solvent used for coating of the recording layer is limited to a very low degree by the interposition of the underlying layer between the substrate and the recording layer. Thus, a lowering of the reflectance of the recording layer is reduced with the resulting much enhancement in S/N ratio.

There is also no deterioration of reflectance with time during storage.

Further, when the recording layer includes thereon the surface layer consisting of a colloidal particle dispersion of a silicon base condensate, there are improvements in the writing sensitivity and output level.

Thus, the optical recording media of the present invention are best-suited for use in the form of the various disks, tapes, drums, cards such as document files, data files, CD and CD-ROM-corresponding DRAW ID cards, video disks, stationary picture files, etc.

Best Mode for Carrying Out the invention

In what follows, the present invention will be explained in further detail with reference to the examples and comparison examples.

EXAMPLE 1

As the substrate use was made of an extruded substrate of polymethyl methacrylate (PMMA), 30 cm in diameter and 1.5 in thickness (Substrate A).

A coating liquid comprising an 1% solution of Dye D-96 and Combiantion S-63 (Weight Ratio D/S=3.7) in dichloroethane and dichlorohexanone (6:5) was applied on Substrate A by means of spinner coating to prepare a recording layer found to have a film thickness of 0.06 microns.

EXAMPLES 2 to 9

The dyes and combinations set forth in Table 1 were applied in the weight ratios set forth in Table 1. In Example 9, the recording layer further contained NC (nitrocellulose). NC had a nitrogen content of 11.5 to 12.2% and a viscosity of 20 seconds as measured according to JIS K 6703.

Example 1 was otherwise repeated.

Comparison Example 1

Example 1 was repeated, except that Combination S-63 was not contained in the recording layer of Example 1.

Comparison Example 2

Example 1 was repeated, except that Dye D-96 was not contained in the recording layer of Example 1.

Comparison Example 3

Example 1 was repeated, except that a tetrabutyl ammonium salt (30 wt %) of Q-1-8 was added as the quencher in place of Combination S-63 in the recording layer used in Ex. 1.

EXAMPLE 10

By means of spinner coating, the substrate used in Ex. 1 was applied thereof with an 1% dye solution of Cyanine Dye D-1 based on indolenine and Combination S-26 of indolenine base cyanine cation with quencher anion (Weight Ratio D/S=3/7) in dichloroethane and dichlorohexanone (6:5) to prepare a recording layer having a film thickness of 0.06 microns.

EXAMPLES 11 to 20

The dyes and combinations set forth in Table 1 were applied in the weight ratios set forth in Table 1.

Example 1 was otherwise repeated.

The dyes used were indolenine base cyanine dyes, and the combinations used were indolenine base cyanine dye cation/quencher anion combinations. In Example 20, the recording layer further contained the aforesaid NC (nitrocellulose).

EXAMPLES 21 and 22

The following coating liquid was coated on each of the recording layers of Examples 2 and 12.

| | |
|---|---|
| Tetraethyl silicate (tetraethoxysilane) | 4.2 parts |
| Ethyl alcohol | 43 parts |
| Ethyl acetate | 42 parts |
| Concentrated hydrochloric acid | 5.4 parts |
| Ethylene glycol | 5.4 parts | were mixed together to prepare a colloidal dispersion of 50 to 80 Å, which was in turn diluted with n-propanol into a coating liquid.

That liquid was spinner-coated on the recording layer, which was treated at 60° C. for 30 minutes. The resulting surface layer was found to have a film thickness of 0.008 microns.

Comparison Example 4

Examples 10 was repeated, except that Combination S-26 was not contained in the recording layer of Example 10.

Comparison Example 5

Example 10 was repeated, except that Dye D-1 was not contained in the recording layer of Example 10.

Comparison Example 6

Example 10 was repeated, except that a tetrabutyl ammonium salt (20 wt %) of Q-1-8 was added as the quencher in place of Combination S-26 in the recording layer of

EXAMPLE 10.

Comparison Example 7

Example 16 was repeated, except that a tetrabutyl ammonium salt (29 wt %) of Q-1-8 was added as the quencher in place of combination S-1 in the recording layer of Example 16.

EXAMPLE 23

A PMMA (MFI=10) injection-molded substrate (Substrate B), 20 cm in diameter and 1.2 mm in thickness, was applied thereon with the underlying layer as mentioned below.

More exactly, ethyl acetate and ethyl alcohol were mixed together in a proportion of 10:11, and Si-$(OC_2H_5)_4$ was gradually added under agitation to the resulting mixture in a proportion of 2/25 relative to ethyl acetate. Then, the solution was allowed to stand for 3-4 days and diluted 10 times with n-propanol. The thus obtained solution was thereafter applied on the substrate, which was treated at 60° C. for 30 minutes.

In this example, the colloidal particles of silicon oxide had a particle size of 50 to 80 Å, and the underlying layer had a film thickness of 0.01 micron.

Subsequently, a recording layer was prepared by spinner-coating of a coating liquid comprising a 1% dye solution of indolenine base cyanine dye D-2 and Combination S-5 of indolenine base cyanine dye cation with quencher anion (Weight Ratio D/S=1/1) in dichloroethane and dichlorohexanone (6:5). The recording layer had a film thickness of 0.07 microns.

EXAMPLES 24 to 35

Example 23 was repeated, except that the dyes and combinations set forth in Table 1 were used in the weight ratios set forth in Table 1. (In Example 24, the same dye, combination and weight ratio as in Ex. 23 were applied.)

Further, the recording layer was applied thereon with a surface layer formed of the same material as the underlying layer of Ex. 23, said surface layer having a thickness as set forth in Table 1. In Example 30, the recording layer further contained the aforesaid NC (nitrocellulose).

Example 23 was othersie repeated. The dyes used were indolenine base cyanine dyes, and the combinations used were indolenine base cyanine dye cation/quencher anion combinations.

Comparison Example 8

Example 31 was repeated, except that the underlying layer of Ex. 31 was not used.

Comparison Example 9

Example 24 was repeated, except that the thickness of the underlying layer used in Ex. 24 was changed from 0.01 micron to 0.002 microns.

Comparison Example 10

Example 24 was repeated, except that the underlying layer used was obtained by coating of a propanol solution of tetraethoxysilane [$Si(C_2H_5O)_4$], and had a thickness of 0.01 micron.

Comparison Example 11

Example 24 was repeated, except that a vacuum-deposited $SiO_2$ film of 0.008 microns in thickness was used as the surface layer in place of the surface layer of Ex. 24.

Comparison Example 12

Example 24 was repeated, except that the surface and underlying layers of Ex. 24 were not used.

As illustrated in FIG. 5, a pair of the samples obtained in each of the Examples and Comparison Examples were integrated, with the recording layers 2 and 2' facing each other through the spacers 5 and 5', into a disk of the so-called air-sandwich structure. In each case, the recording layer 2 was spaced away from 2' by 0.6 mm.

With the use of each disk, measurement was made of the reflectance from the back surface sides of the substrates 1 and 1' at 830 nm.

Using an 830 nm-semiconductor laser, writing was done at a power of 10 mW from the back surface sides of the substrates, an the inverse number of the minimum pulse width (ns) where a reflection level ratio (extinction ratio) of 2 was obtained was measured as a function of sensitivity.

Further measurement was made of changes (%) of the samples in the reflectance from the back surface sides thereof after they had been irradiated with 1 mW laser reading light in the form of pulses of 1 $\mu$sec width and 3 KHz in a stationary state (degradation by reading) and after they had been stored at 40° C. and 88% RH for 500 hours (shelf stability).

While each disk was turned at 1200 rpm, recording was made from the back surface sides of the substrates at a power of 10 mW and a recording rate of 3 MHz with an 830 nm-semiconductor laser. Thereafter, reproduction or reading was done from the back surface sides of the substrates at a power of 0.5 mW with the same semiconductor laser to measure the reproduction output level on an oscilloscope. The measurements are given as the relative values with respect to Comparison Example 1.

Furthermore, measurement was made of C/N ratios at 830 nm and a band width of 30 KHz with a spectrum analyzer manufactured by Hewlett Packard Co., Ltd.

The results are set forth in Table 1.

TABLE 1

| | Substrate | Surface layer ($\mu$m) | Underlying layer ($\mu$m) | Dye D | Combination S | Quencher (wt %) | Resin R | D/S (Weight ratio) | R/D (Weight ratio) |
|---|---|---|---|---|---|---|---|---|---|
| Example 1 | A | — | — | D-96 | S-63 | — | — | 3/7 | — |
| Example 2 | A | — | — | D-96 | S-63 | — | — | 2/1 | — |
| Comparison Example 1 | A | — | — | D-96 | — | — | — | — | — |
| Comparison Example 2 | A | — | — | — | S-63 | — | — | — | — |
| Comparison Example 3 | A | — | — | D-96 | — | $Q^-$-1-8(30) $N^+(C_4H_9)_4$ | — | — | — |
| Example 3 | A | — | — | D-98 | S-75 | — | — | 1/1 | — |
| Example 4 | A | — | — | D-99 | S-76 | — | — | 7/3 | — |
| Example 5 | A | — | — | D-131 | S-98 | — | — | 3/2 | — |
| Example 6 | A | — | — | D-71 | S-106 | — | — | 3/2 | — |
| Example 7 | A | — | — | D-96 | S-107 | — | — | 3/7 | — |
| Example 8 | A | — | — | D-98 | S-108 | — | — | 1/1 | — |
| Example 9 | A | — | — | D-96 | S-115 | — | NC | 5/4 | 1/5 |
| Example 10 | A | — | — | D-1 | S-26 | — | — | 3/7 | — |
| Comparison Example 4 | A | — | — | D-1 | — | — | — | — | — |
| Comparison Example 5 | A | — | — | — | S-26 | — | — | — | — |
| Comparison Example 6 | A | — | — | D-1 | — | $Q^-$-1-8(20) $N^+(C_4H_9)_4$ | — | — | — |
| Example 11 | A | — | — | D-1 | S-5 | — | — | 1/1 | — |
| Example 12 | A | — | — | D-1 | S-5 | — | — | 2/1 | — |
| Example 13 | A | — | — | D-10 | S-6 | — | — | 3/2 | — |
| Example 14 | A | — | — | D-5 | S-1 | — | — | 3/7 | — |
| Example 15 | A | — | — | D-5 | S-2 | — | — | 1/1 | — |
| Example 16 | A | — | — | D-10 | S-1 | — | — | 4/1 | — |
| Comparison Example 7 | A | — | — | D-10 | — | $Q^-$-1-8(29) $N^+(C_4H_9)_4$ | — | — | — |
| Example 17 | A | — | — | D-10 | S-2 | — | — | 3/2 | — |
| Example 18 | A | — | — | D-20 | S-124 | — | — | 3/2 | — |
| Example 19 | A | — | — | D-22 | S-1 | — | — | 2/3 | — |
| Example 20 | A | — | — | D-40 | S-125 | — | NC | 1/1 | 2/9 |
| Example 21 | A | 0.008 | — | D-96 | S-63 | — | — | 2/1 | — |
| Example 22 | A | 0.008 | — | D-1 | S-5 | — | — | 2/1 | — |
| Example 23 | B | — | 0.01 | D-2 | S-5 | — | — | 1/1 | — |
| Example 24 | B | 0.008 | 0.01 | D-2 | S-5 | — | — | 1/1 | — |
| Example 25 | B | 0.008 | 0.01 | D-10 | S-5 | — | — | 1/1 | — |
| Example 26 | B | 0.008 | 0.01 | D-31 | S-5 | — | — | 7/3 | — |
| Example 27 | B | 0.008 | 0.03 | D-13 | S-1 | — | — | 1/1 | — |
| Example 28 | B | 0.01 | 0.01 | D-5 | S-5 | — | — | 3/2 | — |

TABLE 1-continued

| | | | | | | | | | |
|---|---|---|---|---|---|---|---|---|---|
| Example 29 | B | 0.008 | 0.01 | D-2 | S-6 | — | — | 3/2 | — |
| Example 30 | B | 0.008 | 0.01 | D-10 | S-5 | — | NC | 1/1 | 1/5 |
| Example 31 | B | 0.008 | 0.01 | D-5 | S-1 | — | — | 3/2 | — |
| Example 32 | B | 0.008 | 0.01 | D-1 | S-1 | — | — | 2/1 | — |
| Example 33 | B | 0.008 | 0.01 | D-1 | S-5 | — | — | 2/1 | — |
| Example 34 | B | 0.008 | 0.01 | D-10 | S-1 | — | — | 2/1 | — |
| Example 35 | B | 0.008 | — | D-5 | S-1 | — | — | 3/2 | — |
| Comparison Example 8 | B | 0.008 | — | D-5 | S-1 | — | — | 3/2 | — |
| Comparison Example 9 | B | 0.008 | 0.002 | D-2 | S-5 | — | — | 1/1 | — |
| Comparison Example 10 | B | 0.008 | 0.01 [Si($C_2H_5O$)$_4$ coating film] | D-2 | S-5 | — | — | 1/1 | — |
| Comparison Example 11 | B | 0.008 | 0.01 ($SiO_2$ Vapor-deposition) | D-2 | S-5 | — | — | 1/1 | — |
| Comparison Example 12 | B | — | — | D-2 | S-5 | — | — | 1/1 | — |

| | Sensitivity ($\times 10^{-3}$ns$^{-1}$) | Reflectance from substrate | Deterioration-by reading of reflectance (%) | Change in Reflectance during storage (%) | C/N ratio (dB) | Reproduction output level (relative values) |
|---|---|---|---|---|---|---|
| Example 1 | 6.3 | 24 | 3 | 5 | 45 | 1 |
| Example 1 | 6.3 | 26 | 4 | 5 | 46 | 1 |
| Comparison Example 1 | 6.3 | 25 | 65 | 1 | 46 | 1 |
| Comparison Example 2 | 3.3 | 23 | 2 | 3 | 42 | 1 |
| Comparison Example 3 | 2.5 | 23 | 4 | 7 | 42 | 1 |
| Example 3 | 5.0 | 22 | 3 | 4 | 47 | 0.9 |
| Example 4 | 5.0 | 25 | 4 | 4 | 49 | 1 |
| Example 5 | 3.3 | 22 | 5 | 4 | 45 | 0.9 |
| Example 6 | 5.0 | 24 | 3 | 3 | 45 | 1 |
| Example 7 | 5.0 | 24 | 2 | 5 | 44 | 1 |
| Example 8 | 3.3 | 22 | 4 | 3 | 45 | 0.9 |
| Example 9 | 3.3 | 22 | 5 | 5 | 43 | 0.9 |
| Example 10 | 6.3 | 30 | 1 | 1 | 49 | 1.2 |
| Comparison Example 4 | 5.6 | 33 | 58 | 3 | 48 | 1.3 |
| Comparison Example 5 | 5.0 | 28 | 1 | 1 | 46 | 1.1 |
| Comparison Example 6 | 3.3 | 29 | 5 | 5 | 45 | 1.2 |
| Example 11 | 5.6 | 30 | 2 | 2 | 50 | 1.2 |
| Example 12 | 6.3 | 31 | 2 | 2 | 51 | 1.3 |
| Example 13 | 6.3 | 31 | 2 | 1 | 50 | 1.3 |
| Example 14 | 5.0 | 29 | 1 | 1 | 49 | 1.2 |
| Example 15 | 5.0 | 31 | 1 | 2 | 50 | 1.3 |
| Example 16 | 6.3 | 32 | 2 | 2 | 51 | 1.3 |
| Comparison Example 7 | 5.0 | 27 | 3 | 5 | 47 | 1.1 |
| Example 17 | 6.3 | 32 | 2 | 2 | 50 | 1.3 |
| Example 18 | 6.3 | 32 | 1 | 3 | 49 | 1.3 |
| Example 19 | 5.0 | 28 | 1 | 2 | 49 | 1.1 |
| Example 20 | 4.0 | 28 | 3 | 2 | 49 | 1.1 |
| Example 21 | 10.0 | 24 | 2 | 3 | 48 | 2.2 |
| Example 22 | 12.5 | 29 | 1 | 1 | 50 | 2.5 |
| Example 23 | 6.3 | 33 | 2 | 3 | 50 | 1.2 |
| Example 24 | 10.0 | 34 | 2 | 3 | 52 | 2.5 |
| Example 25 | 10.0 | 32 | 1 | 4 | 52 | 2.4 |
| Example 26 | 10.0 | 31 | 2 | 4 | 51 | 2.4 |
| Example 27 | 10.0 | 32 | 1 | 3 | 51 | 2.4 |
| Example 28 | 10.0 | 33 | 2 | 3 | 51 | 2.5 |
| Example 29 | 12.5 | 33 | 3 | 3 | 52 | 2.5 |
| Example 30 | 10.0 | 30 | 2 | 3 | 50 | 2.4 |
| Example 31 | 10.0 | 32 | 1 | 2 | 51 | 2.4 |
| Example 32 | 12.5 | 34 | 1 | 3 | 56 | 2.5 |
| Example 33 | 10.0 | 33 | 1 | 1 | 54 | 2.5 |
| Example 34 | 10.0 | 31 | 1 | 2 | 52 | 2.4 |
| Example 35 | 10.0 | 30 | 1 | 1 | 52 | 2.3 |
| Comparison Example 8 | 5.0 | 6 | — | — | — | — |
| Comparison Example 9 | | Uniform coating was impossible. | | | | |
| Comparison Example 10 | | (Low reflectance gave drum) | | | | |
| Comparison Example 11 | 6.3 | 32 | 2 | 3 | 49 | 2.5 |
| Comparison Example 12 | — | 5 | — | — | — | — |

The effect of the present invention will clearly be understood from the results given in Table 1.

In other words, a comparison of Examples 1 to 9 with Comparison Examples 1 to 3 indicates that the degradation-by-reading of reflectance can be prevented, and improvements are introduced into S/N ratios and sensitivity by the incorporation of the mixture of a cyanine dye with a combination of cyanine dye cation with quencher anion into the recording layer.

From the results of Examples 10 to 20, it is also found that the C/N ratios, sensitivity and shelf stability are much improved, and the degradation-by-reading of reflectance and the changes in reflectance are more effectively avoided by the incorporation of the mixture of an indolecyanine base cyanine dye with a combination of indolenine base cyanine dye cation with quencher anion into the recording layers.

Further, the results of Examples 21 and 22 indicate that the provision of a surface layer gives rise to improvements in the reproduction output level and sensitivity.

Furthermore, the results of Examples 23 to 35 indicate that the reproduction output level, C/N ratios, sensitivity and reflectance from the substrate side are much improved by the provision of an underlying layer consisting of a coating film of a colloidal particle dispersion of a silicon base condensate with or without a surface layer.

We claim:

1. An optical recording medium including a recording layer on a substrate, wherein said recording layer contains a mixture of a cyanine dye with a bonded compound of cyanine dye cation with quencher anion.

2. The optical recording medium as defined in claim 1, wherein the cyanine dye is an indolenine base cyanine dye.

3. The optical recording medium as defined in claim 2, wherein the cyanine dye cation is an indolenine base cyanine dye.

4. The optical recording medium as defined in claim 3, wherein the quencher anion is an anion of a transition metal chelate compound.

5. The optical recording medium as defined in claim 4, wherein the transition metal chelate compound is an anion of a bis-phenyldithiol base transition complex.

6. The optical recording medium as defined in claim 1, wherein the bonded compound is contained in an amount of 10 to 80 wt %.

7. The optical recording medium as defined in claim 1, wherein the recording layer has a thickness of 400 to 1200 Å.

8. The optical recording medium as defined in claim 1, wherein the substrate is substantially transparent to writing light and reading light.

9. The optical recording medium as defined in claim 1, wherein the substrate is fomed of a resin.

10. The optical recording medium as defined in claim 9, wherein the resin is an acrylic resin or polycarbonate resin.

11. The optical recording medium as defined in claim 8, wherein writing and reading are carried out from the back surface side of the substrate.

12. The optical recording medium as defined in claim 11, wherein no reflective layer is provided on the recording layer.

13. The optical recording medium as defined in claim 1, wherein the substrate includes therein an underlying layer, which includes thereon the recording layer.

14. The optical recording medium as defined in claim 13, wherein the underlying layer is formed of a coating film of a colloidal particle dispersion of a silicon base condensate.

15. The optical recording medium as defined in claim 14, wherein the colloidal particle has a particle size of 30 to 100 Å.

16. The optical recording medium as defined in claim 14, wherein the substrate is formed of an acrylic resin or polycarbonate resin.

17. The optical recording medium as defined in claim 14, wherein the underlying layer has a thickness of 50 to 500 Å.

18. The optical recording medium as defined in claim 14, wherein the recording layer contains a mixture of an indolenine base cyanine dye with a bonded compound of indolenine base cyanine cation with quencher anion.

19. The optical recording medium as defined in claim 18, wherein the quencher anion is an anion of bis-phenyldithiol base transition metal complex.

20. The optical recording medium as defined in claim 14, wherein the bonded compound is contained in an amount of 10 to 80 wt %.

21. The optical recording medium as defined in claim 14, wherein writing and reading are carried out from the back surface side of the substrate.

22. The optical recording medium as defined in claim 21, wherein the substrate is substantially transparent to writing light and reading light, and no reflective layer is provided on the recording layer.

23. The optical recording medium as defined in claim 1, wherein the substrate includes thereon the recording layer, which includes thereon a surface layer.

24. The optical recording medium as defined in claim 23, wherein the surface layer has a thickness of 50 to 300 Å.

25. The optical recording medium as defined in claim 23, wherein the surface layer is formed of a coating film of a colloidal particle dispersion of a silicon base condensate.

26. The optical recording medium as defined in claim 25, wherein the colloidal particle has a particle size of 30 to 100 Å.

27. The optical recording medium as defined in claim 25, wherein the recording layer contains a mixture of an indolenine base cyanine dye with a bonded compound of indolenine base cyanine dye cation with quencher anion.

28. The optical recording medium as defined in claim 27, wherein the quencher anion is an anion of a bis-phenyldithiol base transition metal complex.

29. The optical recording medium as defined in claim 25, wherein the bonded compound is contained in an amount of 10 to 80 wt %.

30. The optical recording medium as defined in claim 25, wherein the substrate is formed of an acrylic resin or polycarbonate resin.

31. The optical recording medium as defined in claim 25, wherein writing and reading are carried out from the back surface side of the substrate.

32. The optical recording medium as defined in claim 31, wherein the substrate is substantially transparent to writing light and reading light, and no reflective layer is provided on the recording layer.

33. The optical recording medium as defined in claim 13, wherein the substrate includes thereon the recording layer, which includes thereon a surface layer.

34. The optical recording medium as defined in claim 33, wherein the surface layer has a thickness of 50 to 300 Å.

35. The optical recording medium as defined in claim 33, wherein the surface layer is formed of a coating film of a colloidal particle dispersion of a silicon base condensate.

36. The optical recording medium as defined in claim 35, wherein the colloidal particle has a particle size of 30 to 100 Å.

37. The optical recording medium as defined in claim 35, wherein the underlying layer is formed of a coating film of a colloidal particle dispersion of a silicon base condensate.

38. The optical recording medium as defined in claim 37, wherein the colloidal particle has a particle size of 30 to 100 Å.

39. The optical recording medium as defined in claim 35, wherein the resin is an acrylic resin or polycarbonate resin.

40. The optical recording medium as defined in claim 35, wherein the recording layer contains a mixture of an indolenine base cyanine dye with a bonded compound of indolenine base cyanine cation with quencher anion.

41. The optical recording medium as defined in claim 40, wherein the quencher anion is an anion of a bisphenyldithiol base transition metal complex.

42. The optical recording medium as defined in claim 35, wherein the bonded compound is contained in an amount of 10 to 80 wt %.

43. The optical recording medium as defined in claim 35, wherein writing and reading are carried out from the back surface side of the substrate.

44. The optical recording medium as defined in claim 43, wherein the substrate is substantially transparent to writing light and reading light, and no reflective layer is provided on the recording layer.

* * * * *